US011477680B2

(12) United States Patent
Chung et al.

(10) Patent No.: US 11,477,680 B2
(45) Date of Patent: Oct. 18, 2022

(54) ELECTRONIC DEVICE AND CELLULAR COMMUNICATION QUALITY MEASUREMENT INTERVAL ADJUSTMENT METHOD THEREOF

(71) Applicant: Samsung Electronics Co., Ltd., Suwon-si (KR)

(72) Inventors: Wonsuk Chung, Suwon-si (KR); Junsuk Kim, Suwon-si (KR); Sangho Lee, Suwon-si (KR); Jangbok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 16/946,349

(22) Filed: Jun. 17, 2020

(65) Prior Publication Data
US 2021/0058808 A1     Feb. 25, 2021

(30) Foreign Application Priority Data
Aug. 19, 2019   (KR) ........................ 10-2019-0101377

(51) Int. Cl.
*H04W 24/10*      (2009.01)
*H04W 76/16*      (2018.01)
*H04W 88/06*      (2009.01)

(52) U.S. Cl.
CPC ........... *H04W 24/10* (2013.01); *H04W 76/16* (2018.02); *H04W 88/06* (2013.01)

(58) Field of Classification Search
CPC ..... H04W 24/10; H04W 76/16; H04W 88/06; H04W 76/28; H04W 36/0085;
(Continued)

(56) References Cited

U.S. PATENT DOCUMENTS 9,198,098 B2   11/2015   Yang et al.
9,603,084 B2    3/2017   Kim et al.
(Continued)

FOREIGN PATENT DOCUMENTS

IN   201837006338 A   *   3/2018   ........... H04W 24/02
KR   10-2015-0088716 A       8/2015
(Continued)

OTHER PUBLICATIONS

International Search Report and Written Opinion of the International Searching Authority in connection with International Application No. PCT/KR2020/006803 dated Aug. 28, 2020, 9 pages.

*Primary Examiner* — Charles C Jiang
*Assistant Examiner* — Thad N Defauw

(57) ABSTRACT

An electronic device and an operation method of the electronic device are disclosed in various embodiments. The electronic device may include a first communication processor in primary cellular communication with a primary node and a second communication processor in primary cellular communication with a secondary node, wherein the first communication processor may be configured to control to receive a request signal requesting for measurement of quality of the secondary cellular communication from the primary node, transmit a signal requesting to the second communication processor for measurement of the quality of the secondary cellular communication to the second communication processor at a predetermined interval based on receipt of the request signal, receive a secondary cellular communication quality measurement result from the second communication processor, and adjust the predetermined interval based on the measurement result. Other various embodiments are possible.

19 Claims, 20 Drawing Sheets

(58) Field of Classification Search
CPC ............. H04W 52/0248; H04W 24/02; H04W 52/0258; H04W 24/08; Y02D 30/70; H04B 17/318
See application file for complete search history.

(56) References Cited

U.S. PATENT DOCUMENTS

| | | |
|---|---|---|
| 10,244,436 B2 | 3/2019 | Kim |
| 2012/0083290 A1* | 4/2012 | Jung ................. H04W 36/0088 455/456.1 |
| 2014/0200002 A1 | 7/2014 | Vangala et al. |
| 2016/0381588 A1* | 12/2016 | Strobl ................... H04W 24/10 455/67.11 |
| 2018/0332659 A1 | 11/2018 | Hwang et al. |
| 2019/0174341 A1 | 6/2019 | Chincholi et al. |
| 2020/0015135 A1* | 1/2020 | Ericson ............. H04W 36/0094 |

FOREIGN PATENT DOCUMENTS

| | | |
|---|---|---|
| WO | 2013189441 A2 | 12/2013 |
| WO | 2018063073 A1 | 4/2018 |

* cited by examiner

ELECTRONIC DEVICE AND CELLULAR COMMUNICATION QUALITY MEASUREMENT INTERVAL ADJUSTMENT METHOD THEREOF

CROSS-REFERENCE TO RELATED APPLICATION

This application is based on and claims priority under 35 U.S.C. § 119 to Korean Patent Application No. 10-2019-0101377 filed on Aug. 19, 2019, in the Korean Intellectual Property Office, the disclosures of which are herein incorporated by reference in their entireties.

BACKGROUND

1. Field

Certain embodiments according to this disclosure relate to an electronic device and operation method thereof and, in particular, to a technology for adjustment of a communication quality measurement interval.

2. Description of Related Art

As various electronic devices such as smart phones, tablet personal computers (PCs), portable multimedia players (PMPs), personal digital assistants (PDAs), laptop PCs, and wearable devices are distributed, various wireless communication technologies used for communication by various electronic devices are being developed.

In order to meet wireless data traffic demands that have increased after $4^{th}$ Generation (4G) communication system commercialization, efforts to develop an improved $4^{th}$ Generation (5G) communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

The above information is presented as background information only to assist with an understanding of the disclosure. No determination has been made, and no assertion is made, as to whether any of the above might be applicable as prior art with regard to the disclosure.

SUMMARY

In the E-UTRA New Radio dual connectivity (EN-DC) architecture for supporting $4^{th}$ (4G) and $5^{th}$ generation (5G) communication, it may be possible to configure a 4G base station as a master node and a 5G base station as a secondary node.

The 5G base station may use a spectrum in a frequency range higher than the existing 4G frequency range in addition to the 4G frequency range. A 5G base station operating in such a high frequency band characterized by a superior straightness may be likely to have small coverage.

In the EN-DC environment, the master node in 4G communication with an electronic device may transmit to the electronic device a quality measurement request signal for 5G communication. If the electronic device receives the quality measurement request signal, it may perform quality measurement for 5G communication. If the electronic device is located within an area where 5G signal strength is weak, it may repeat 5G communication quality measurement, suspending transmission of a measurement result to the master node.

Such repetitive communication quality measurements may consume power unnecessarily. The power consumption caused by repeating the 5G communication quality measurement may surpass the power consumption necessary for maintaining a 5G connected state independently of 5G communication quality.

According to various embodiments according to this disclosure disclosed herein, an electronic device is provided. The electronic device includes a first communication processor in primary cellular communication with a primary node and a second communication processor in primary cellular communication with a secondary node, wherein the first communication processor is configured to control to receive a request signal requesting for measurement of quality of the secondary cellular communication from the primary node, transmit a signal requesting to the second communication processor for measurement of the quality of the secondary cellular communication to the second communication processor at a predetermined interval based on receipt of the request signal, receive a secondary cellular communication quality measurement result from the second communication processor, and adjust the predetermined interval based on the measurement result.

According to various embodiments according to this disclosure, an operation method of an electronic device is provided. The method includes receiving, at a first communication processor, a request signal requesting for measurement of quality of secondary cellular communication from a primary node in primary cellular communication with the electronic device, transmitting a signal requesting for measurement of the quality of the secondary cellular communication, from the first communication processor to a second communication processor in secondary cellular communication with a secondary node, at a predetermined interval, receiving, at the first communication processor, a secondary cellular communication quality measurement result from the second communication processor, and adjusting, at the first communication processor, the predetermined interval based on the measurement result.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In the drawings, the same or similar reference numerals may be used for the same or similar components.

DETAILED DESCRIPTION

Figure 1:
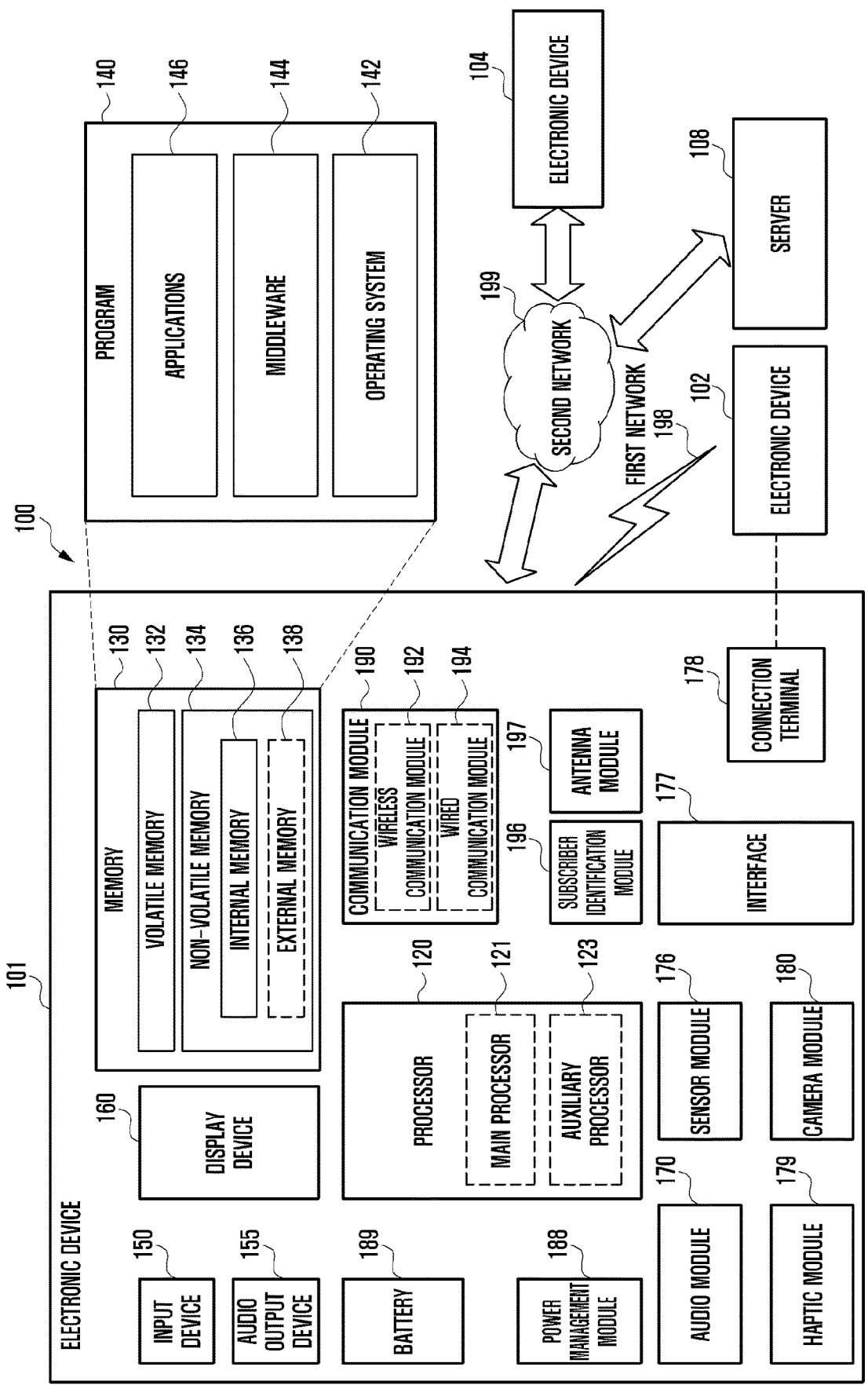
FIG. 1 illustrates, in block diagram format, an example of an electronic device according to various embodiments according to this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device, FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
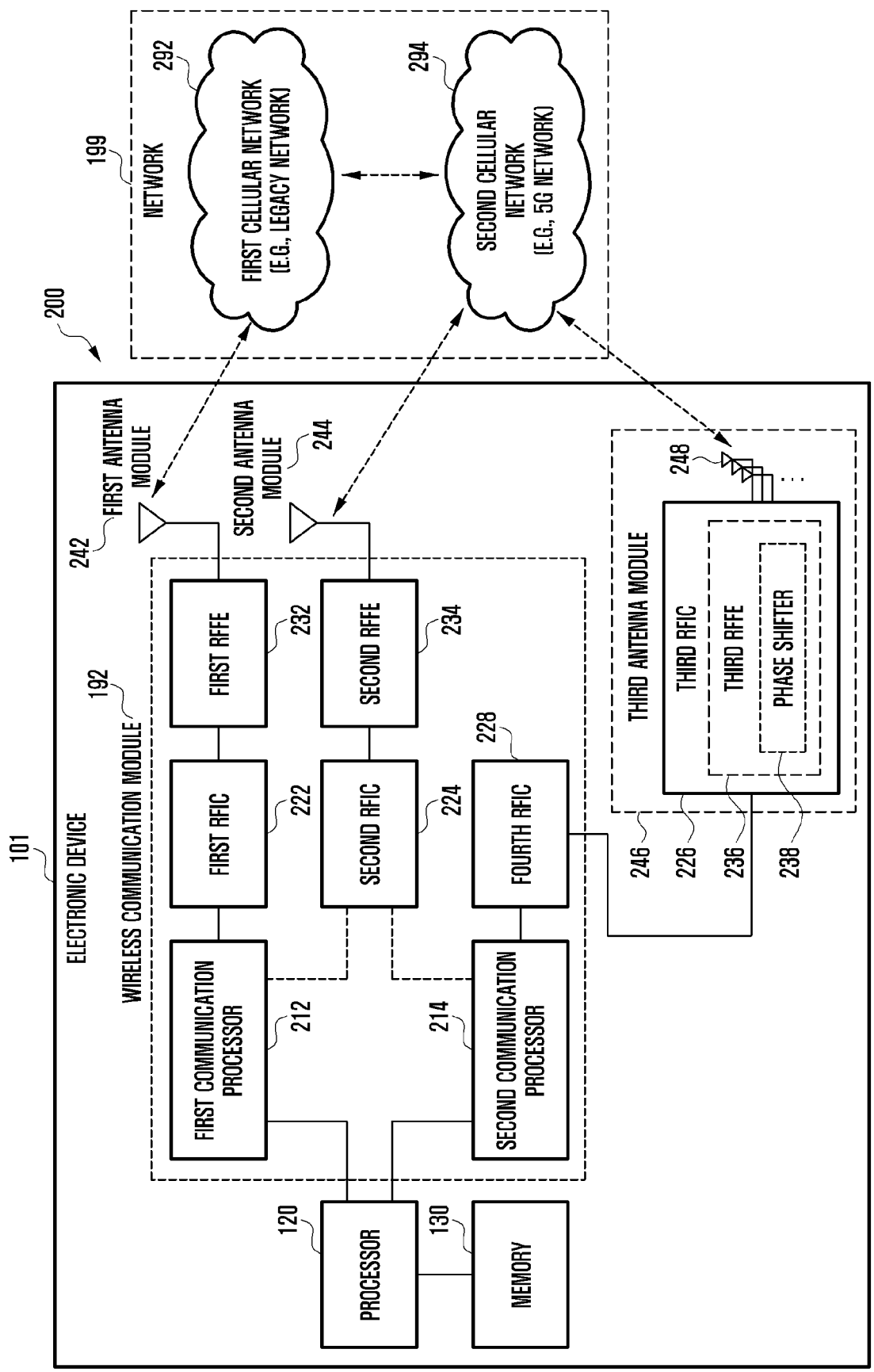
FIG. 2 illustrates, in block diagram format, an example of an electronic device for supporting legacy network communication and 5G network communication according to various embodiments according to this disclosure.

FIG. 2 is a block diagram 200 of an electronic device 101 for supporting legacy network communication and 5G network communication according to certain embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel. According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
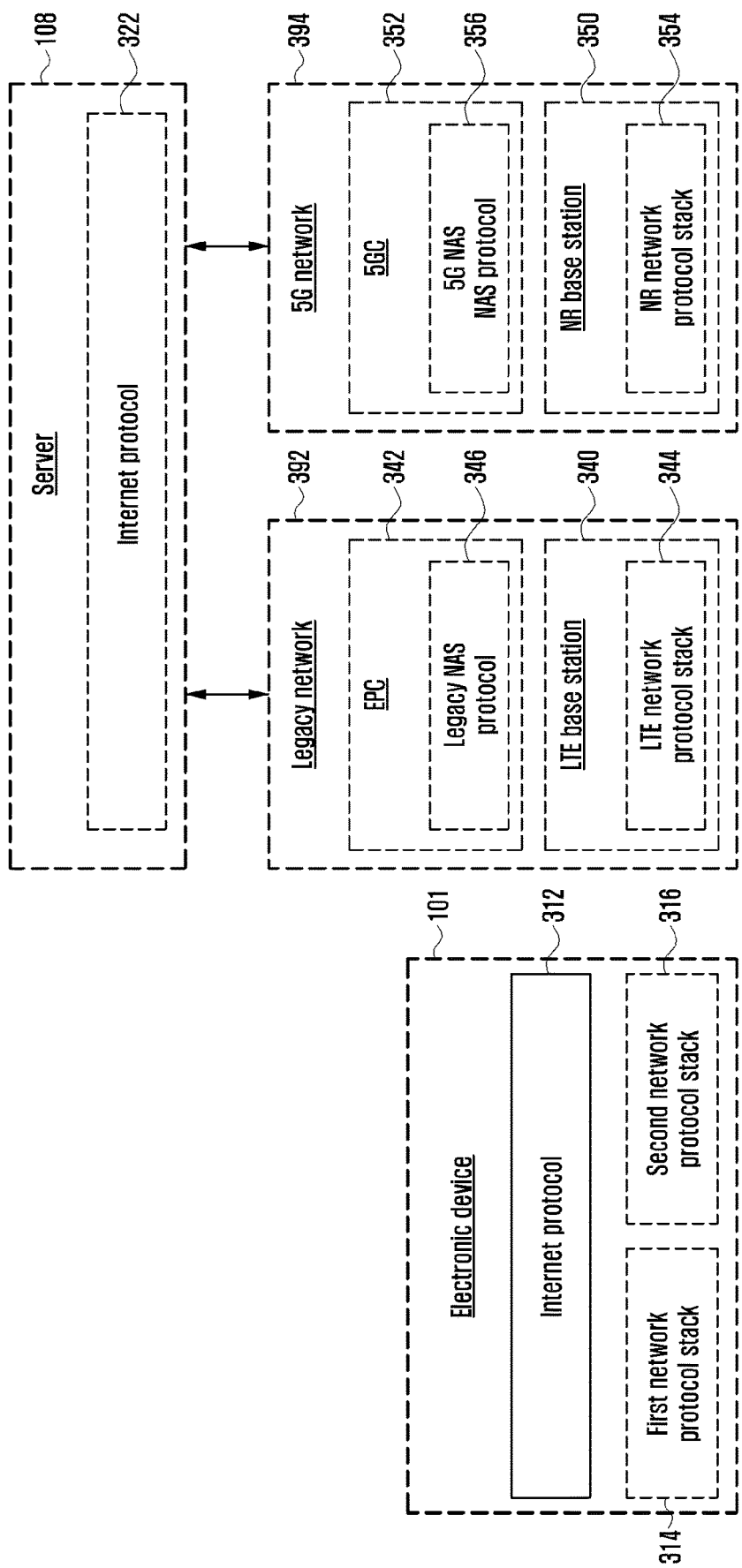
FIG. 3 illustrates an example of a protocol stack structure of a legacy communication and/or 5G communication network according to various embodiments according to this disclosure.

FIG. 3 illustrates a protocol stack structure of the network 100 of legacy communication and/or 5G communication according to an embodiment.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARD) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
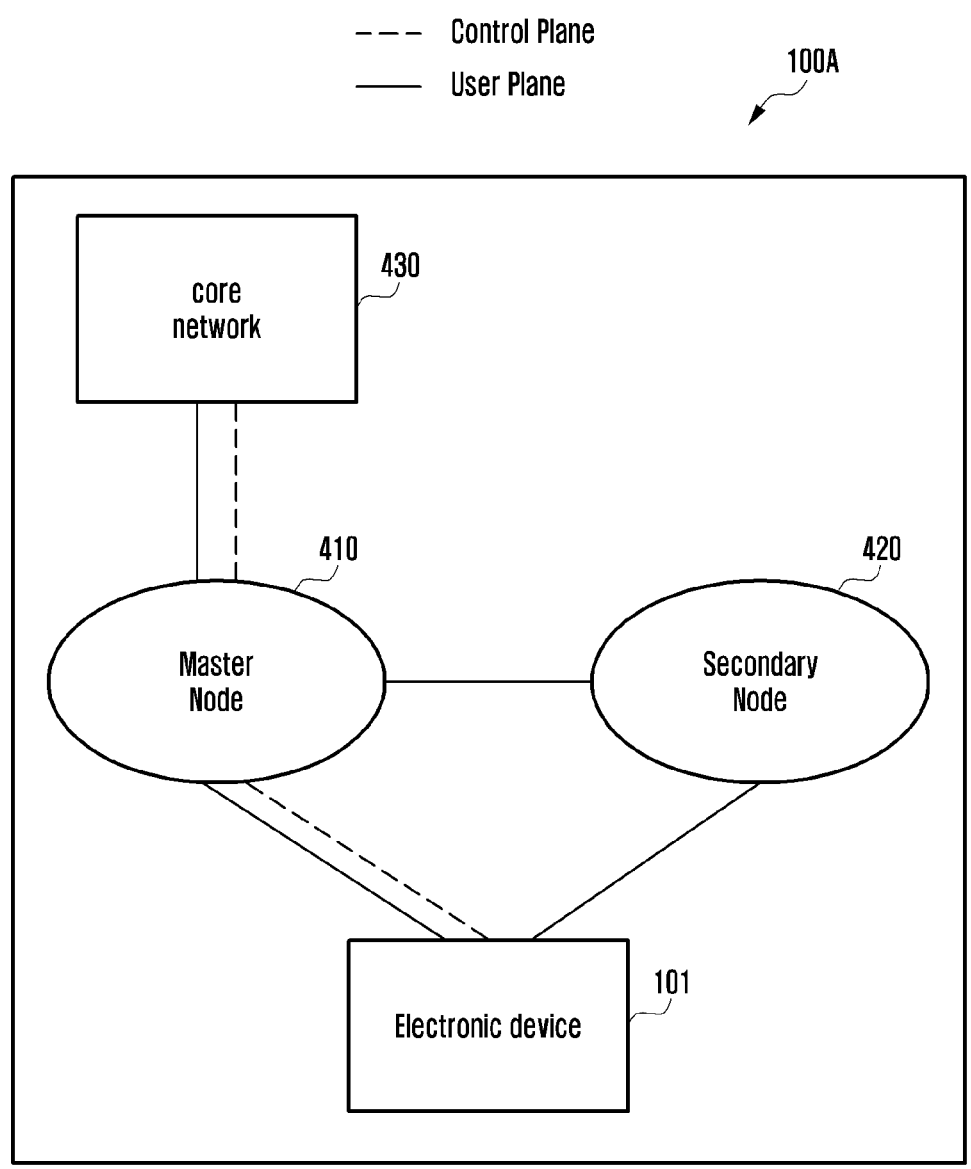
FIGS. 4A to 4C illustrate examples of wireless communication systems for providing a legacy communication and/or a 5G communication network according to various embodiments according to this disclosure.
Figure 4B:
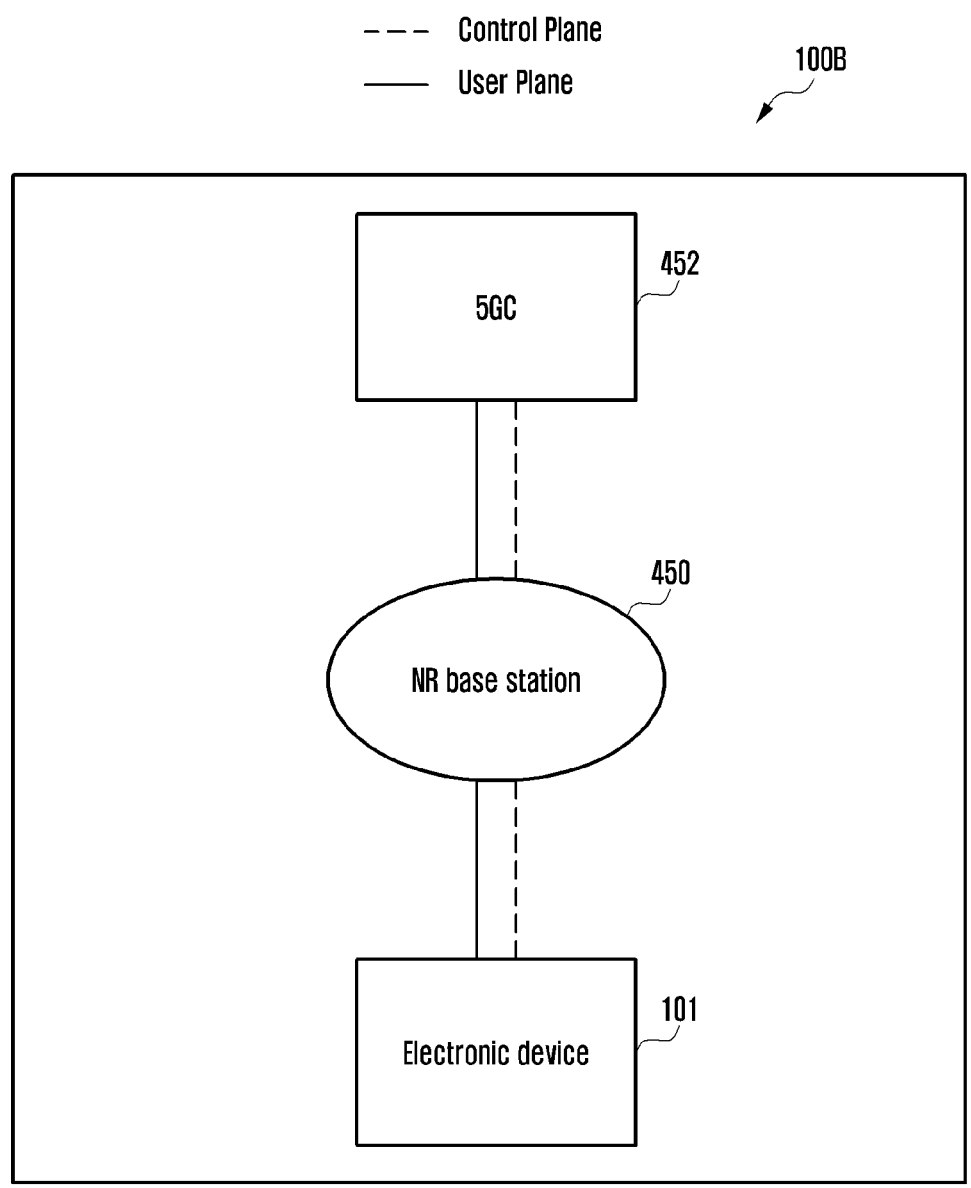
Figure 4C:
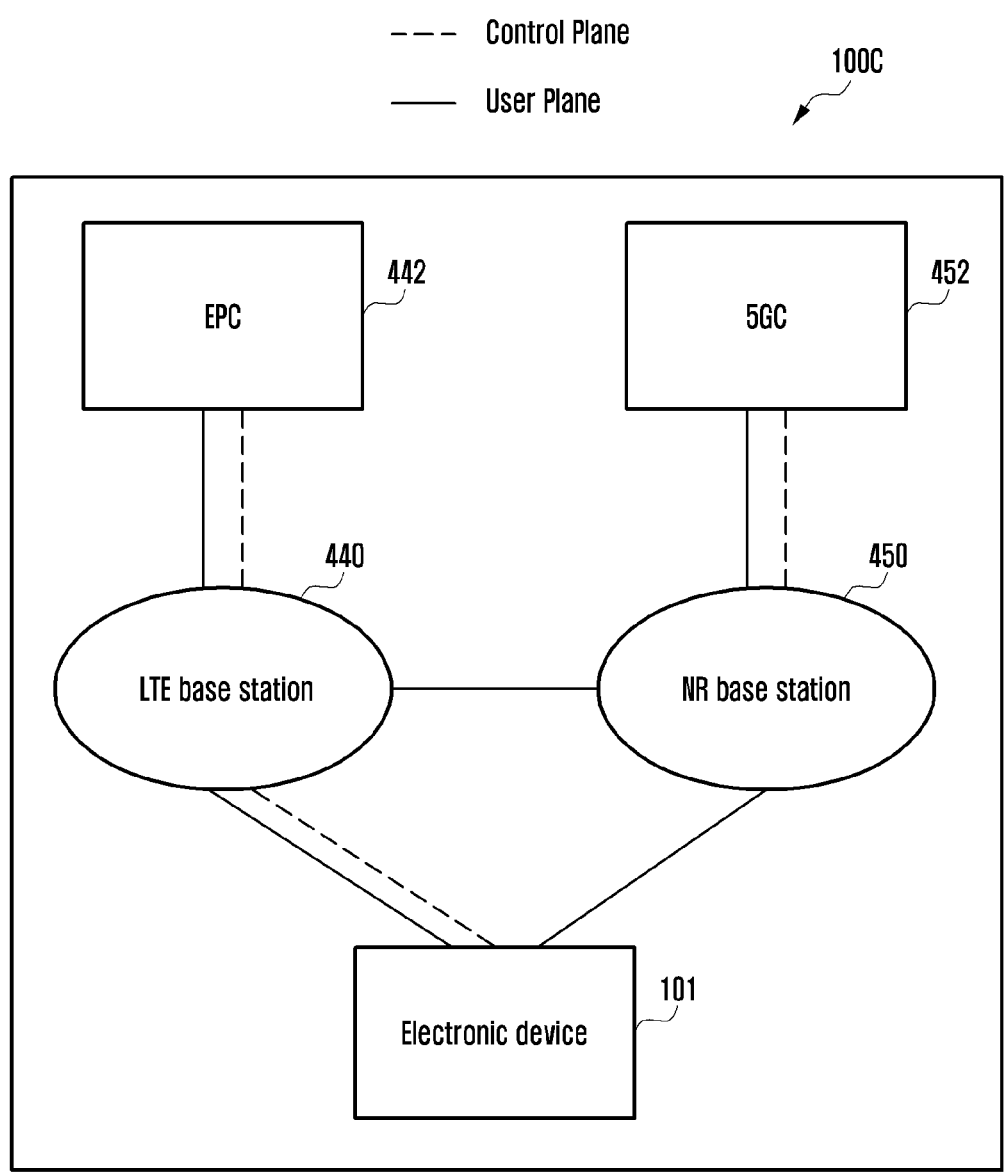

FIG. 4A illustrates a wireless communication system providing a network of legacy communication and/or 5G communication according to certain embodiments, FIG. 4B illustrates a wireless communication system providing a network of legacy communication and/or 5G communication according to certain embodiments, and FIG. 4C illustrates a wireless communication system providing a network of legacy communication and/or 5G communication according to certain embodiments. Referring to FIGS. 4A to 4C, network environments 100A to 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a $5^{th}$ generation core (5GC) 452 for managing 5G communication of the electronic device 101.

According to certain embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to certain embodiments, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 450. According to another embodiment, the electronic device 101 and the 5GC 452 may transmit and receive a control message and user data through the NR gNB 450.

According to certain embodiments, the electronic device 101 may be registered in at least one of the EPC 442 or the 5GC 450 and transmit and receive a control message.

According to certain embodiments, the EPC 442 or the 5GC 452 may interwork and manage communication of the electronic device 101. For example, movement information of the electronic device 101 may be transmitted and received through an interface between the EPC 442 and the 5GC 452.

Figure 5A:
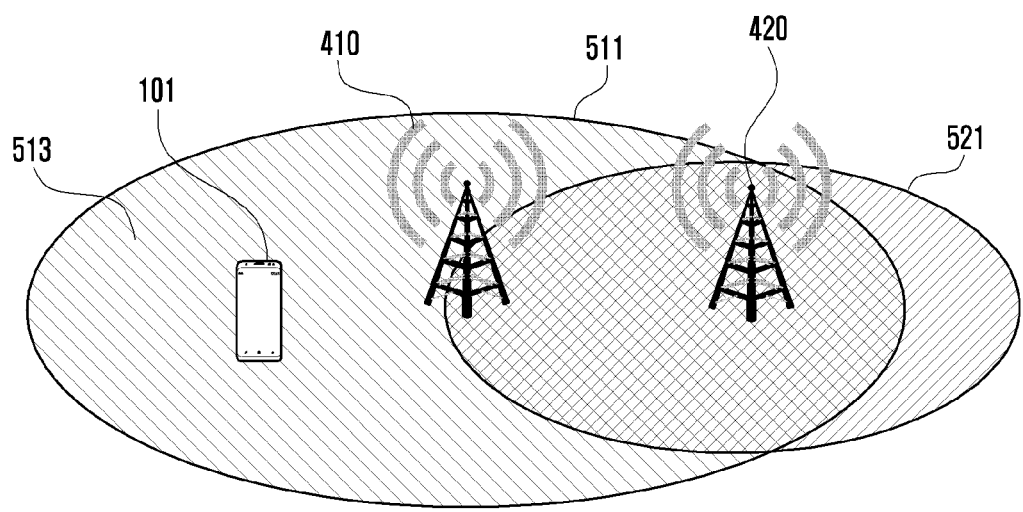
FIGS. 5A and 5B illustrate examples of situations where an electronic device is located in an area where the quality of secondary cellular communication is poor according to various embodiments according to this disclosure.
Figure 5B:
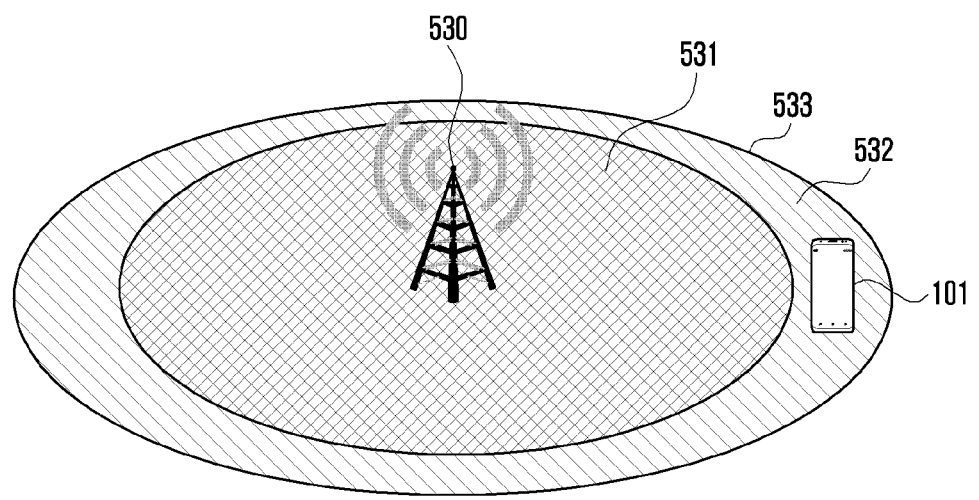

FIGS. 5A and 5B illustrate examples of situations where an electronic device is located in an area where the quality of secondary cellular communication is poor according to various embodiments according to this disclosure.

In the non-limiting example of FIG. 5A, the electronic device (e.g., electronic device 101 in FIG. 1) may communicate data with a primary node (e.g., master node 410 in FIG. 4A) via primary cellular communication. The primary cellular communication may be based on one of various cellular communication technologies being supported by the electronic device 101. For example, the primary cellular communication may be based on one of a 4G mobile communication technology (e.g., LTE, LTE-Advanced (LTE-A), and LTE-A pro) or a 5G mobile communication technology (e.g., 5G New Radio (NR)) specified by 3GPP, e.g., communication technology for the first network 292 in FIG. 2. The primary node 410 may comprise a base station supporting the primary cellular communication.

According to various embodiments according to this disclosure, the electronic device 101 may communicate data with the secondary node (e.g., secondary node 420 in FIG. 4A) via secondary cellular communication. The secondary cellular communication may be based on one of various cellular communication technologies. For example, the secondary cellular communication may be based on one of various cellular communication technologies supported by the electronic device 101, e.g., communication technology for the second network 294 in FIG. 2. The secondary node 420 may, in some embodiments, comprise a base station supporting the secondary cellular communication.

Although the example described with reference to FIG. 4 is directed to an EN-DC environment in which the primary cellular communication system is a 4G mobile communication system and the secondary cellular communication system is a 5G mobile communication system for convenience of explanation, the disclosure is not limited to such an exemplary embodiment. For example, embodiments according the disclosure may also be embodied in an NR-E-UTRA Dual Connectivity (NE-DC) environment in which the primary cellular communication system is a 5G mobile communication system and the secondary cellular communication system is a 4G mobile communication system and a dual connectivity environment in which the primary and secondary cellular communication systems are 5G mobile communication systems operating in different frequency bands.

According to various embodiments, the electronic device 101 supporting the EN-DC may connect to the primary node 410 of the primary cellular communication system. The electronic device 101 may receive various signals for establishing a connection to the secondary node 420 of the secondary cellular communication system from the primary node 410. For example, the primary node 410 may transmit to the electronic device 101 a secondary cellular communication quality measurement request signal to establish a secondary cellular connection between the electronic device 101 and the secondary cellular communication system. Upon receipt of the secondary cellular communication quality measurement request signal, the electronic device may perform secondary cellular communication quality measurement. In certain embodiments, the electronic device 101 may report the quality of communication via the secondary cellular communication system to the primary node 410 based on the quality of communication with the second cellular communication system being equal to or higher than (or greater) a predetermined threshold. Upon receipt of the information on the quality of communication with the second cellular communication system, the primary node 410 may determine whether to allow establishment of a connection between electronic device 101 and the secondary node 420 of the secondary cellular communication system. The electronic device 101 may not report the quality of communication via the secondary cellular communication system to the primary node 410 based on the quality of communication via the secondary cellular communication system being equal to or lower than (or less than) the predetermined threshold.

According to various embodiments, a frequency at which the first cellular communication system operates may be lower than a frequency at which the secondary cellular communication system operates. Typically, a cellular communication system operating in a high frequency band has relatively small coverage because of the high straightness of the signal. As shown in the illustrative example of FIG. 5A, the coverage 511 of the primary node 410 is greater than the coverage 521 of the secondary node 420. In the explanatory example of FIG. 4B, the primary node 410 and the secondary node 420 are implemented in a single base station, and the primary cellular communication system coverage 533 is greater than the secondary cellular communication system coverage 531.

According to various embodiments, the primary node 410 or the base station 530 may transmit to the electronic device 101 a secondary cellular communication quality measurement request signal for establishing a connection between the electronic device 101 and the secondary cellular communication system via the primary cellular communication system. Upon receipt of the secondary cellular communication quality measurement request signal for establishing a connection between the electronic device 101 and the secondary cellular communication system from the primary node 410 or the base station 530, the electronic device 101 may perform secondary cellular communication quality measurement. In the case where the electronic device 101 is located at an area (e.g., area 513 in FIG. 5A and area 532 in FIG. 5B) where the secondary cellular communication quality is poor within the primary cellular communication system coverage, it may repeat the secondary cellular communication quality measurement, suspending transmission of a secondary cellular communication quality measurement result to the primary node 410 or base station 530, based on the secondary cellular communication quality being equal to or lower than (or less than) a predetermined threshold. If the electronic device 101 performs the secondary cellular communication quality measurement repetitively, this may cause a communication processor (e.g., second communication processor 214 in FIG. 2) responsible for the secondary cellular communication to wake up frequently and prevent a communication processor (e.g., first communication processor 212 in FIG. 2) responsible for the primary cellular communication from transitioning to the sleep mode in the C-DRX mode. Furthermore, such frequent wake-up and failure of transition to the sleep mode of the communication processors increases power consumption of the electronic device 101. For example, the power consumption caused by repeating secondary cellular communication quality measurement may exceed the power consumption necessary for maintaining the connection for the secondary cellular communication independently of the secondary cellular communication quality. A description is made hereinafter of the method for adjusting a secondary cellular communication quality measurement interval or a secondary cellular communication quality measurement timing to overcome the above problems.

Figure 6:
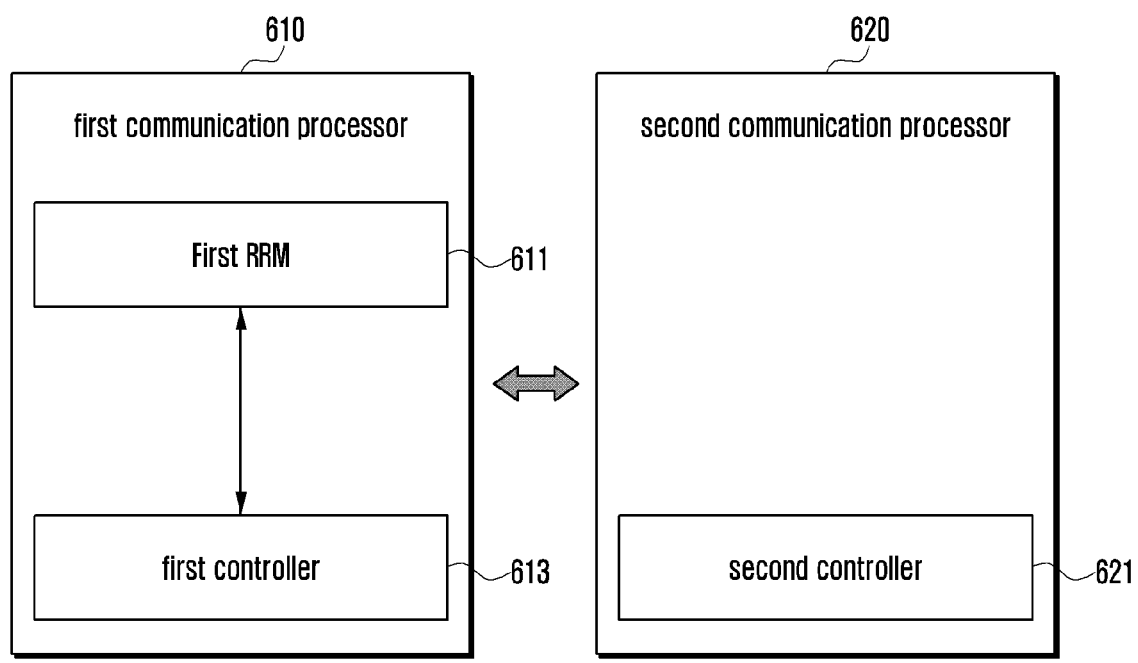
FIG. 6 illustrates, in block diagram format, an example of a configuration of an electronic device according to various embodiments according to this disclosure.

FIG. 6 illustrates an example of a configuration of an electronic device according to various embodiments according to this disclosure.

Referring to the non-limiting example of FIG. 6, an electronic device (e.g., electronic device 101) may include a first communication processor 610 (e.g., first communication processor 212 in FIG. 2) and a second communication processor 620 (e.g., second communication processor 214 in FIG. 2).

According to various embodiments according to this disclosure, the first communication processor 610 may perform primary cellular communication with a primary node (e.g., master node 410 in FIG. 4A). The first communication processor 610 may communicate control message and data with the primary node 410 of a primary cellular communication system. In some embodiments, the primary cellular communication system may be one of various types of cellular communication systems supported by the electronic device 101. For example, the primary cellular communication system (e.g., first network 292 in FIG. 2) may be one of a 4G mobile communication system (e.g., LTE, LTE-A, and LTE-A pro) or a 5G mobile communication system (e.g., 5G New Radio (NR)). The primary node 410 may mean a base station supporting the primary cellular communication system.

According to various embodiments according to this disclosure, the second communication processor 620 may perform secondary cellular communication with a secondary node (e.g., secondary node 420 in FIG. 4A). The second communication processor 620 may communicate data with the secondary node 420 of a secondary cellular communication system. The secondary cellular communication system may be one of various types of cellular communication systems supported by the electronic device 101. For example, the secondary cellular communication system (e.g., second network 294 in FIG. 2) may be one of the 4G mobile communication system (e.g., LTE, LTE-A, and LTE-A pro) or the 5G mobile communication system (e.g., 5G New Radio (NR)). The secondary node 420 may mean a base station supporting the secondary cellular communication system. According to certain embodiments, the first and second communication processors 610 and 620 may be integrated into a single chip or a single package.

According to various embodiments according to this disclosure, the first communication processor 510 may include a first radio resource manager (RRM) 611 and a first controller 610.

According to various embodiments according to this disclosure, the first RRM 611 may be responsible for radio resource management for primary or secondary cellular communication (e.g., radio access control, channel allocation, power control, handoff management, packet scheduling, and primary or secondary cellular communication quality measurement). The first RRM 611 may be embodied as one or more of a hardware or software component implemented in the first communication processor 610.

According to various embodiments according to this disclosure, the first RRM 611 may perform scheduling for measurement of a primary cellular communication quality (quality measurement based on a signal in a frequency band currently in use (intra-frequency) or a signal in a frequency band neighboring the frequency band currently in use (inter-frequency)) upon receipt of a primary cellular communication quality measurement request signal transmitted by the primary node 410 of the primary cellular communication system. The primary cellular communication quality may include information on the strength of a signal (e.g., at least one of a reference signal, an LTE CRS, an SSS included in an NR SS/PBCH block, a PBCH DMRS included in an NR SS/PBCH block, and an LTE CSI-RS) being transmitted by the primary node 410 of the primary cellular communication system (e.g., reference signal received power (RSRP or received signal strength indicator (RSSI)).

According to various embodiments, the first RRM 611 may perform scheduling for measurement of secondary cellular communication quality (inter-RAT measurement) upon receipt of a secondary cellular communication quality measurement request signal transmitted by the primary node 410 of the primary cellular communication system. The secondary cellular communication quality may include information on the strength of a signal (e.g., at least one of a reference signal, an LTE CRS, an SSS included in an NR SS/PBCH block, a PBCH DMRS included in an NR SS/PBCH block, and an LTE CSI-RS) being transmitted by the secondary node 420 of the secondary cellular communication system (e.g., RSRP or RSSI). According to various embodiments according to this disclosure, the first RRM 611 may perform scheduling for the primary or secondary cellular communication quality measurement and send schedule data for the communication quality measurement to the first controller 613. The schedule data may include a primary or secondary cellular communication quality measurement interval.

According to various embodiments, the first controller 613 may be embodied as one or more of a hardware or software component implemented in the first communication processor 610 and may control physical (PHY) layer operations for primary communication. The first controller 610 may receive the schedule data from the first RRM 611 and perform primary or second cellular communication quality measurement based on the schedule data. The first controller 613 may perform primary cellular communication quality measurement and send a primary cellular communication quality measurement result to the first RRM 611. The first controller 613 may send the second controller 621 a secondary cellular communication quality measurement request signal for secondary cellular communication quality measurement.

According to various embodiments, the second controller 621 may be a hardware or software component implemented in the second communication processor 620 and may control PHY (or L1) layer operations for secondary communication.

According to various embodiments according to this disclosure, the second controller 621 may perform secondary cellular communication quality measurement at a predetermined measurement interval after receipt of the secondary cellular communication quality measurement request signal from the first controller 613. The secondary cellular communication quality measurement may include an operation of measuring the strength of a signal transmitted by the secondary node 420 responsible for secondary cellular communication. The second controller 621 may send a secondary cellular communication quality measurement result to the first controller.

According to various embodiments according to this disclosure, the first controller 613 may send a primary or secondary cellular communication quality measurement result to the first RRM 611.

According to various embodiments, the first RRM 611 may identify the secondary cellular communication quality measurement result and determine whether the secondary cellular communication quality is equal to or better than (or better than) a threshold. The first RRM 611 may transmit the secondary cellular communication quality measurement result to the primary node 410 based on the secondary cellular communication quality being equal to or better than (or better than) the threshold. The first RRM 611 may not transmit the secondary cellular communication quality measurement result to the primary node 410 based on the secondary cellular communication quality being poorer than (or equal to or poorer than) the threshold.

According to various embodiments according to this disclosure, the first RRM 611 may adjust the measurement interval based on the secondary cellular communication quality measurement result. The first RRM 611 may generate schedule data including the adjusted measurement interval and send the schedule data to the second controller 621 in order for the second controller 621 to adjust the secondary cellular communication quality measurement interval based on the received measurement interval.

According to various embodiments according to this disclosure, the first RRM 611 may increase the secondary cellular communication quality measurement interval based on a value corresponding to the secondary cellular communication quality measurement result being less than a predetermined value. According to various embodiments, the measurement interval may increase in a stepwise manner. According to various embodiments, the measurement interval may be increased up to the longest measurement interval allowed in the standard. The predetermined value may be a value associated with the threshold in use by the electronic device 101 to determine whether to transmit the secondary cellular communication quality measurement result to the primary node 410. For example, the predetermined value may be set to a value obtained by subtracting a predetermined size of a gap (guard gap for hysteresis) from the threshold. The size of the gap may be variable according to the secondary cellular communication quality, or fixed, regardless of the secondary cellular communication quality.

According to various embodiments according to this disclosure, the first RRM 611 may determine to change an amount of the measurement interval based on the difference between the secondary cellular communication quality measurement result and the predetermined value. The first RRM 611 may increase the measurement interval as the difference between the secondary cellular communication quality measurement result and the predetermined value increases. According to various embodiments, the measurement interval may increase in a stepwise manner. According to various embodiments, the measurement interval may be increased up to the longest measurement interval allowed in the standard. The first RRM 611 may decrease the measurement interval as the difference between the secondary cellular communication quality measurement result and the predetermined value decreases.

According to various embodiments according to this disclosure, the first RRM 611 may adjust the measurement interval based on a rate of change of the secondary cellular communication quality measurement result. The rate of change of the secondary cellular communication quality measurement result may be a rate of change of a value indicating the secondary cellular communication quality measurement result (e.g., time domain first order differential value of the secondary cellular communication quality measurement result).

According to various embodiments according to this disclosure, the first RRM 611 may increase the measurement interval based on the rate of change of the secondary cellular communication quality measurement value being 0 (e.g., secondary cellular communication quality being maintained). The first RRM 611 may increase the measurement interval as the time period during which the secondary cellular communication quality measurement value remains at 0, or increases. According to various embodiments, the measurement period may increase in a stepwise manner. According to various embodiments, the measurement interval may be increased up to the longest measurement interval allowed in the standard.

According to various embodiments according to this disclosure, the first RRM 611 may decrease the measurement interval based on the rate of change of the secondary cellular communication quality measurement result being a positive number.

According to various embodiments according to this disclosure, the first RRM 611 may increase the measurement interval based on the rate of change of the secondary cellular communication quality measurement result being a negative number.

According to various embodiments according to this disclosure, the first RRM 611 may determine the rate of change of the measurement interval based on the size of the absolute value of the rate of change of the secondary cellular communication quality measurement result. The first RRM 611 may increase the measurement interval as the size of the absolute value of the rate of change of the secondary cellular communication quality measurement result increases.

According to various embodiments according to this disclosure, the first RRM 611 may adjust the measurement interval based on the acceleration of change of the secondary cellular communication quality measurement. The acceleration of change of the secondary cellular communication quality measurement may be a second order rate of change of a value indicating the secondary cellular communication quality measurement result (e.g., time domain second order differential value of the value indicating the secondary cellular communication quality measurement value). The electronic device 101 may adjust the measurement interval based on the acceleration of change of the secondary cellular communication quality measurement result in consideration of the mobility of the electronic device. According to various embodiments, the measurement period may increase in a stepwise manner. According to various embodiments, the measurement interval may be increased up to the longest measurement interval allowed in the standard. For example, if the electronic device 101 moves into or out of the coverage of the secondary node 420, it may adjust the measurement interval based on its moving speed.

According to various embodiments according to this disclosure, the primary cellular communication quality measurement interval may be adjusted in a predetermined range. The first RRM 611 may adjust the primary cellular communication quality measurement interval between a shortest measurement interval and a longest measurement interval based on a primary cellular communication quality-related characteristic. The longest measurement interval may be the longest time period allowed in the standard.

According to various embodiments according to this disclosure, the secondary cellular communication quality measurement interval may be adjusted in a predetermined range. The first RRM 611 may adjust the secondary cellular communication quality measurement interval between a shortest measurement interval and a longest measurement interval based on a secondary cellular communication quality-related characteristic. The longest measurement interval may be the longest time period allowed in the standard.

According to various embodiments according to this disclosure, the first RRM 611 may stop the secondary cellular communication quality measurement based on the secondary cellular communication quality measurement interval remaining at the longest measurement interval over a predetermined time period. The first RRM 611 that has stopped the secondary cellular communication quality measurement may resume the stopped secondary cellular communication quality measurement upon detection of movement of the electronic device 101. The first RRM 611 may perform the secondary cellular communication quality measurement at the longest measurement interval.

According to various embodiments according to this disclosure, the first RRM 611 may detect the movement of the electronic device 101 in various manners.

For example, the first RRM 611 may resume the secondary cellular communication quality measurement upon receipt of information indicative of movement of the electronic device 101 (e.g., at least one of information generated by the sensor module 176 of FIG. 1 upon detection of movement of the electronic device 101 and information generated by the processor 120 upon determination of a movement in a geofenced area) from an application processor (e.g., at least one of the main and auxiliary processors 121 and 123 of the processor 120 in FIG. 1) that is operationally connected to the first communication processor 610.

As another illustrative example, the first RRM 611 may resume the secondary cellular communication quality measurement based on information generated by the first communication processor 610 or received from the second communication processor 620 (e.g., information indicative of detection of a movement of the electronic device 101 based on the strength of a signal in a frequency band neighboring the frequency band of the signal being transmitted or received via primary cellular communication, information indicative of detection of a movement of the electronic device 101 based on the Doppler effect determinable in the PHY layer, or cell information on the cell involved in the primary cellular communication).

According to various embodiments according to this disclosure, the primary RRM 611 may adjust the secondary cellular communication quality measurement interval based on a secondary cellular communication quality-related characteristic. The electronic device 101 may reduce its power consumption in an area where the secondary cellular communication quality is relatively poor by adjusting the secondary cellular communication quality measurement interval.

A description is made hereinafter of an example of a method according to some embodiments of this disclosure for adjusting a secondary cellular communication quality measurement request signal transmission timing to mitigate any increase of power consumption of the electronic device 101 that is caused by unnecessarily repetitive secondary cellular communication quality measurement.

According to various embodiments according to this disclosure, the first communication processor 610 may support the C-DRX mode for reducing power consumption of the electronic device 101 during the primary cellular communication. The second communication processor 620 may support the C-DRX mode for reducing power consumption of the electronic device 101 during the secondary cellular communication. The first controller 613 implemented in the first communication processor 610 may send a secondary cellular communication quality measurement request signal to the second controller 621 implemented in the second communication processor 620 based on a schedule list generated by the first RRM 611.

According to various embodiments, the first controller 613 may send the secondary cellular communication quality measurement request signal in the course of data transmission or reception via primary cellular communication. The first controller 613 may not transmit the secondary cellular communication quality measurement request signal to the second controller 621 during a time period (e.g., on-duration or sleep duration of C-DRX mode) in which no data is transmitted or received via the primary cellular communication.

According to various embodiments, the first controller 613 may adjust a secondary cellular communication quality measurement request signal transmission timing in such that it skips a secondary cellular communication quality measurement request signal transmission operation during the time period in which no data is transmitted or received via the primary cellular communication. The first controller 613 may enable the first communication processor 610 to enter the sleep duration of the C-DRX mode without any disruption caused by the necessity of sending the secondary cellular communication quality measurement request signal in such a way of adjusting the secondary cellular communication quality measurement request signal transmission timing, which contributes to power saving.

According to various embodiments according to this disclosure, in the case where no data is transmitted or received via the primary cellular communication, the first controller 613 may send the secondary cellular communication quality measurement request signal to the second controller 621 after elapse of a predetermined time period. The predetermined time period may be set to one of the maximum value of the secondary cellular communication quality measurement interval or the on-duration of the C-DRX mode.

Figure 7:
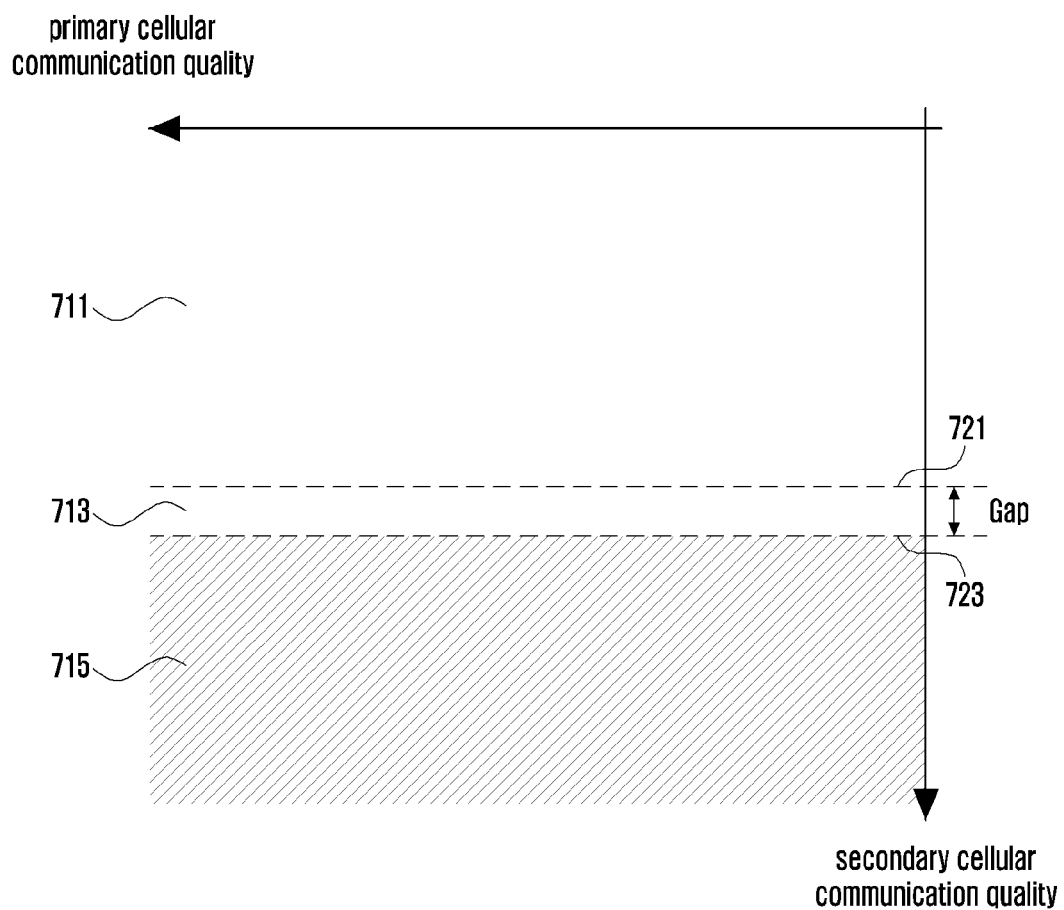
FIG. 7 illustrates an example of a condition adjusting a secondary cellular communication quality measurement interval of an electronic device according to various embodiments according to this disclosure.

FIG. 7 illustrates an example of a condition of adjusting a secondary cellular communication quality measurement interval of an electronic device according to various embodiments according to this disclosure.

According to certain embodiments, FIG. 7 illustrates an example of a condition for performing an operation of adjusting the secondary cellular communication quality measurement interval according to a primary cellular communication quality and a secondary cellular communication quality.

According to various embodiments, the electronic device 101 (or first communication processor 610 in FIG. 6) may identify the secondary cellular communication quality measured by a second communication processor (e.g., second communication processor 620). The first communication processor 610 may transmit the information on the secondary cellular communication quality to the primary node 410 based on the secondary cellular communication quality being equal to or better than (or better than) a threshold 721. The first communication processor 610 may not transmit the information on the secondary cellular communication quality to the primary node 410 and may control the second communication processor 620 to perform secondary cellular communication quality measurement at a predetermined measurement interval until the secondary cellular communication quality is equal to or better than the threshold 721 as denoted by reference number 711 based on the secondary cellular communication quality being poorer (or equal to or poorer) than the threshold 721 as denoted by reference numbers 713 and 715. The first communication processor 610 may control the second communication processor 620 by sending a secondary cellular communication quality measurement request signal to the second communication processor 620 at the predetermined measurement interval.

According to various embodiments according to this disclosure, the first communication processor 610 may not adjust the secondary cellular communication quality measurement interval and perform the secondary cellular communication quality measurement at the predetermined measurement interval (e.g., shortest secondary cellular communication quality measurement interval) based on the secondary cellular communication quality being equal to or poorer than the threshold 721 and equal to or better than a predetermined value 723.

According to various embodiments according to this disclosure, the first communication processor 610 may adjust the secondary cellular communication quality measurement interval based on the secondary cellular communication quality to reduce power consumption of the electronic device 101.

According to various embodiments according to this disclosure, the first communication controller 610 may increase the secondary cellular communication quality measurement interval based on the secondary communication quality being equal to or poorer than the predetermined value 723. The predetermined value 723 may be a value associated with the threshold 721 in use for determining whether to allow the electronic device 101 to transmit the secondary cellular communication quality measurement result to the primary node 410. For example, the predetermined value 723 may be set to a value obtained by subtracting a predetermined size of gap from a value of the threshold 721. The size of the gap may be a value variable according to the secondary cellular communication quality or a value fixed regardless of the secondary cellular communication quality.

According to various embodiments according to this disclosure, the first communication processor 610 may adjust the measurement interval based on at least one cellular communication quality-related characteristic (e.g., a difference between the secondary cellular communication measurement result and the predetermined value 723, a rate of change of the secondary cellular communication measurement result, and a second order rate of change of the secondary cellular communication measurement result). The first communication processor 610 may adjust the measurement interval based on the secondary cellular communication quality-related characteristic regardless of the primary cellular communication quality.

Figure 8A:
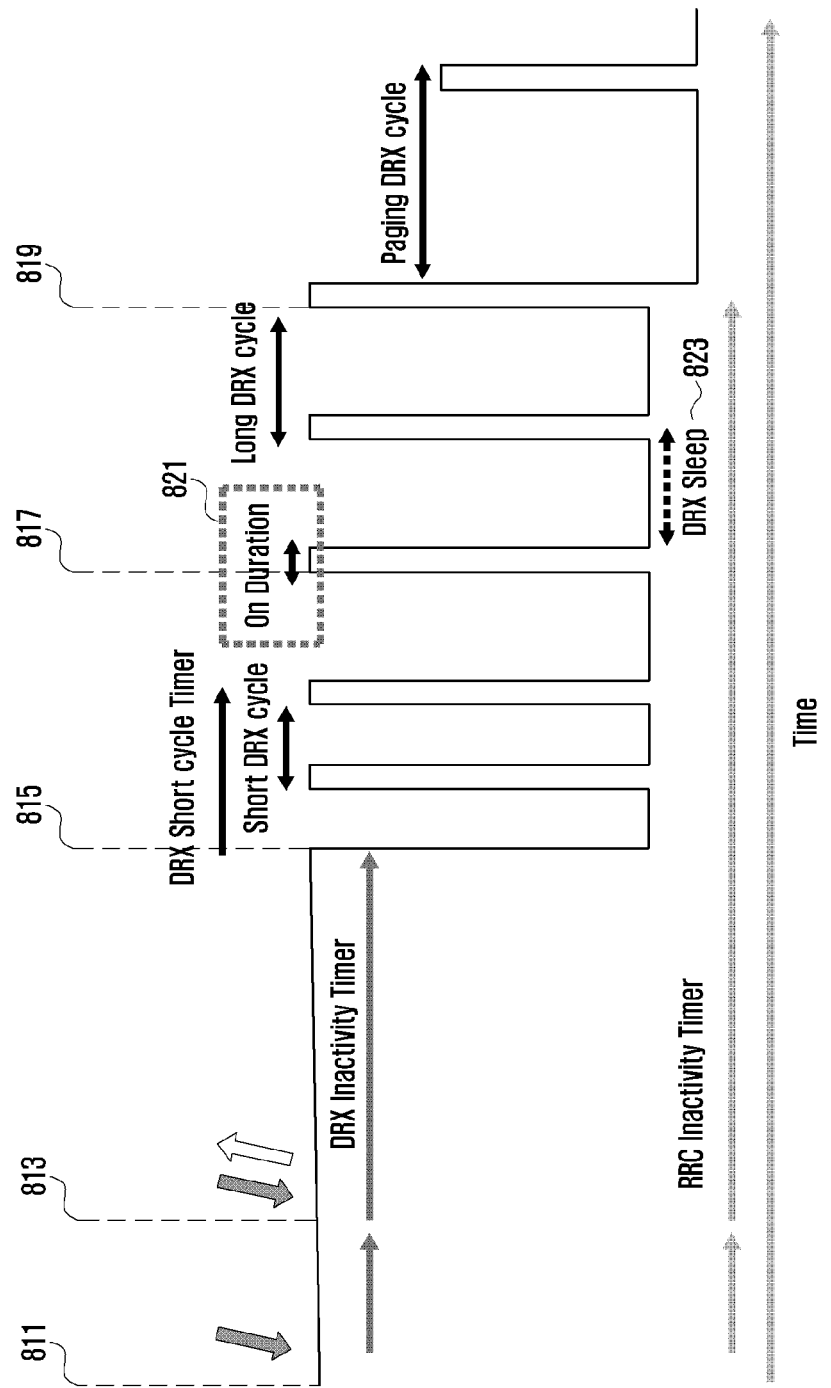
FIGS. 8A to 8C illustrate examples of a secondary cellular communication quality measurement control method of an electronic device in C-DRX mode according to various embodiments according to this disclosure.
Figure 8B:
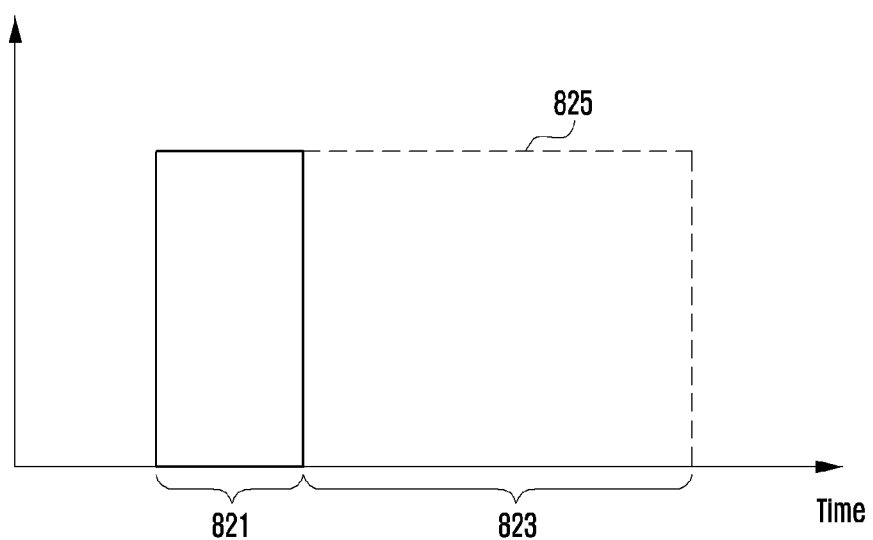
Figure 8C:
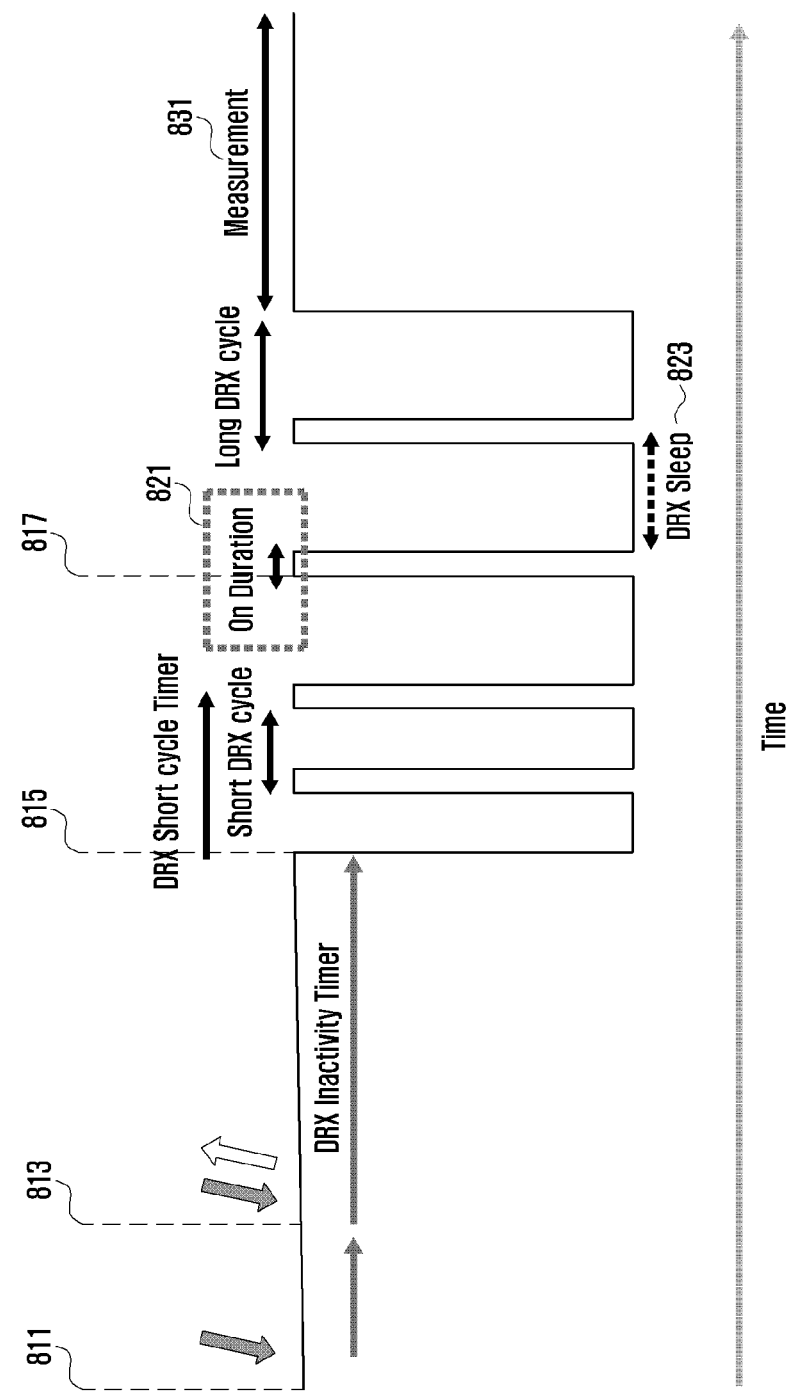

FIGS. 8A through 8C illustrate examples of a secondary cellular communication quality measurement control method of an electronic device according to various embodiments according to this disclosure.

FIG. 8A illustrates an example of operations of an electronic device (e.g., electronic device 101 in FIG. 1) in C-DRX mode according to various embodiments according to this disclosure.

Referring to the non-limiting example of FIG. 8A, the electronic device 101 may start a timer for entry into a sleep mode supported in the C-DRX mode (DRX inactivity timer) and/or a timer for release of radio resources allocated for transmitting or receiving data via primary cellular communication (RRC inactivity timer) after completing data transmission or reception via the primary cellular communication as denoted by reference number 811.

According to various embodiments according to this disclosure, the electronic device 101 may restart the timers in the case where data transmission or reception operation is executed during the periods the timers are running as denoted by reference number 813.

According to various embodiments according to this disclosure, the electronic device 101 may enter the sleep mode supported in the C-DRX mode upon elapse of a predetermined time period of the DRX inactivity timer configured for entry into the sleep mode as denoted by reference number 815. The sleep mode may be a mode in which the electronic device 101 receives data for connection to the primary node 410 only during an on-duration period 821 and enters a sleep period (DRX sleep) 823 in which no data is transmitted or received to or from the primary node 410.

According to various embodiments according to this disclosure, the electronic device 101 may increase the time period of suspending transmission/reception of data (length of the on-duration period) upon detection of elapse of a predetermined time period with no data transmission/reception since the entry into the sleep period as denoted by reference number 817.

According to various embodiments according to this disclosure, the primary node 410 may control the electronic device 101 to release radio resources allocated for the primary cellular communication upon detection of elapse of a predetermined time period of the RRC inactivity timer configured for release of radio resources allocated for transmitting or receiving data via the primary cellular communication as denoted by reference number 819. According to various embodiments, the electronic device may release the connection for the primary cellular communication upon receipt of a primary cellular communication connection release message from the primary node 410. According to various embodiments, the electronic device 101 may transition its RRC state from the RRC Connected state to the RRC Idle state upon release of the radio resources. According to various embodiments, the electronic device 101 may transition its RRC state from the RRC Connected state to the RRC Inactive state upon release of the radio resources.

According to various embodiments according to this disclosure, a first communication processor (e.g., first communication processor 610 in FIG. 6) may receive a secondary cellular communication quality measurement request signal from the primary node 410 during the on-duration period 821 in the sleep mode. The first communication processor 610 may not enter the sleep period 823 and may remain in the on-duration period 821 until a secondary cellular communication quality measurement result is received from a second communication processor (e.g., second communication processor 620).

FIG. 8B shows a comparative example. In the non-limiting comparative example of FIG. 8B, the secondary cellular communication quality measurement request signal is received from the primary node 410 during the on-duration period 821, the first communication processor 610 may send the secondary cellular communication quality measurement signal to the second communication processor 620. The first communication processor 610 may not enter the sleep period 823 and may remain in the activated state as denoted by reference number 825 until the secondary cellular communication quality measurement result from the second communication processor 620. It may occur that the first communication processor 610 cannot enter the sleep mode because of the secondary cellular communication quality measurement, even though there is no data transmission/reception via the primary cellular communication.

According to various embodiments according to this disclosure, if a secondary cellular communication quality measurement request signal is received from the primary node 410 during the on-duration period 821, the first communication processor 610 may enter the sleep period 823 without transmitting the secondary cellular communication quality measurement request signal to the second communication processor 620.

According to various embodiments according to this disclosure, the first communication processor 610 may send the secondary cellular communication quality measurement request signal to the second communication processor 620 during the data transmission or reception via the primary cellular communication following the sleep period 823.

Referring now to the non-limiting example of FIG. 8C, the first communication processor 610 may enter the sleep period 823, upon receipt of the secondary cellular communication quality measurement request signal during the on-duration period 821, without transmitting the secondary cellular communication quality measurement request signal to the second communication processor 620. The first communication processor 610 may send the secondary cellular communication quality measurement request signal to the second communication processor 620 during the data transmission or reception via the primary cellular communication following the sleep period 823.

According to various embodiments according to this disclosure, the first communication processor 610 may adjust the transmission timing of the secondary cellular communication quality measurement request signal in such a way of skipping the operation of sending the secondary cellular communication quality measurement request signal during the period of no data transmission/reception via the primary cellular communication. Such an adjustment of the timing of sending the secondary cellular communication quality measurement request signal enables the first communication processor 610 to enter the sleep period of the C-DRX mode without any disruption caused by the necessity of sending the secondary cellular communication quality measurement request signal and makes it possible to prevent repeating unnecessary secondary cellular communication quality measurement, which contributes to power saving of the electronic device 101.

FIGS. 9A to 9D are diagrams illustrate examples of a secondary cellular communication quality measurement interval adjustment method of an electronic device according to various embodiments according to this disclosure.

Figure 9A:
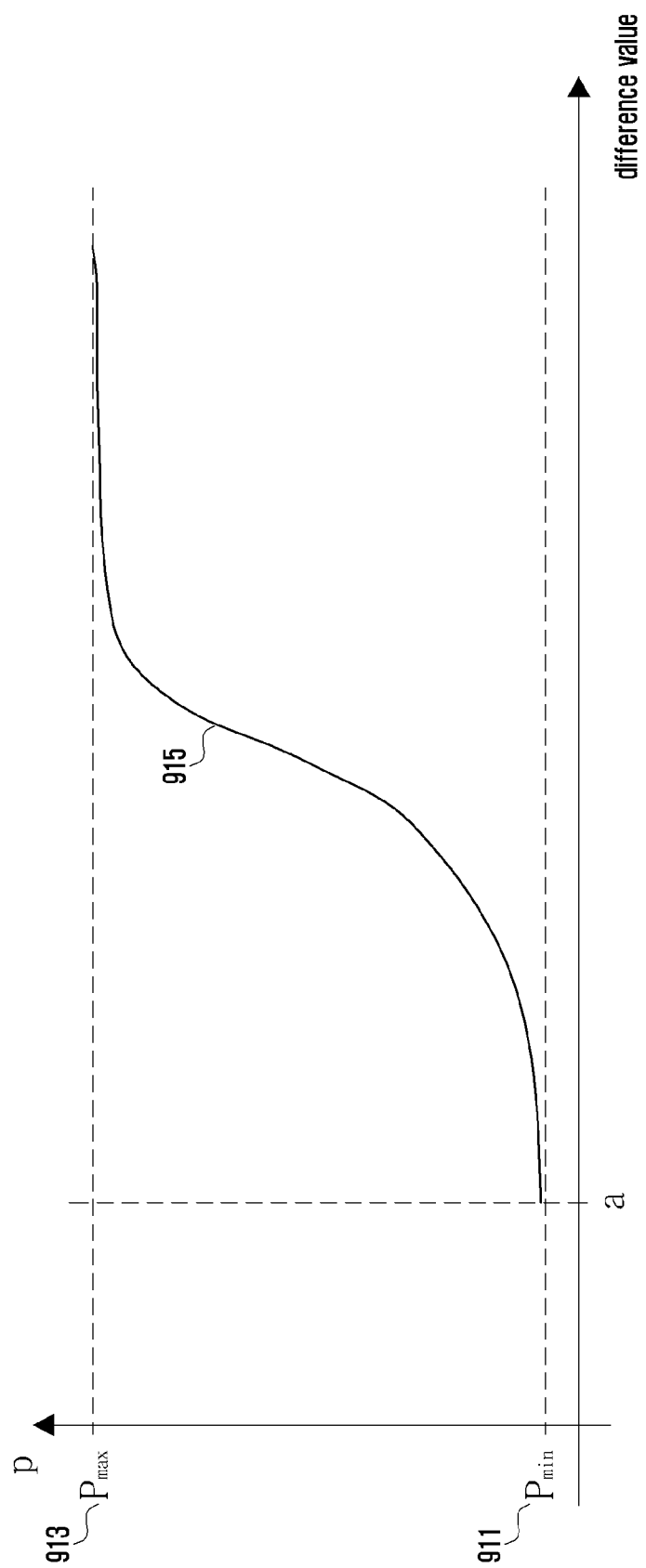
FIGS. 9A to 9E illustrate examples of a secondary cellular communication quality-based secondary cellular communication quality measurement interval adjustment method of an electronic device according to various embodiments according to this disclosure.

FIG. 9A is a graph illustrating an example of a function for use by an electronic device (e.g., electronic device 101 in FIG. 6) in adjusting a secondary cellular communication quality measurement interval based on secondary cellular communication quality according to various embodiments according to this disclosure.

According to various embodiments, a first communication processor (e.g., first communication processor 610 in FIG. 6) may adjust the secondary cellular communication quality measurement interval using the function represented by a curve 915 that maps a measurement interval to a value associated with a secondary cellular communication quality measurement result (e.g. difference between a secondary cellular communication measurement result and a predetermined value, rate of change of the secondary cellular communication measurement result, or second order rate of change of the secondary cellular communication measurement result).

As shown in the illustrative example of FIG. 9A, as the difference between the secondary cellular communication measurement and the predetermined value (e.g., predetermined value 723 in FIG. 7) decreases (e.g., secondary cellular communication quality increases), the secondary cellular communication quality measurement interval becomes close to the shortest measurement interval 911. According to the function represented by the curve 915, the secondary cellular communication quality measurement interval become close to the longest measurement interval 913 as the difference between the secondary cellular communication measurement and the predetermined value increases.

Figure 9B:
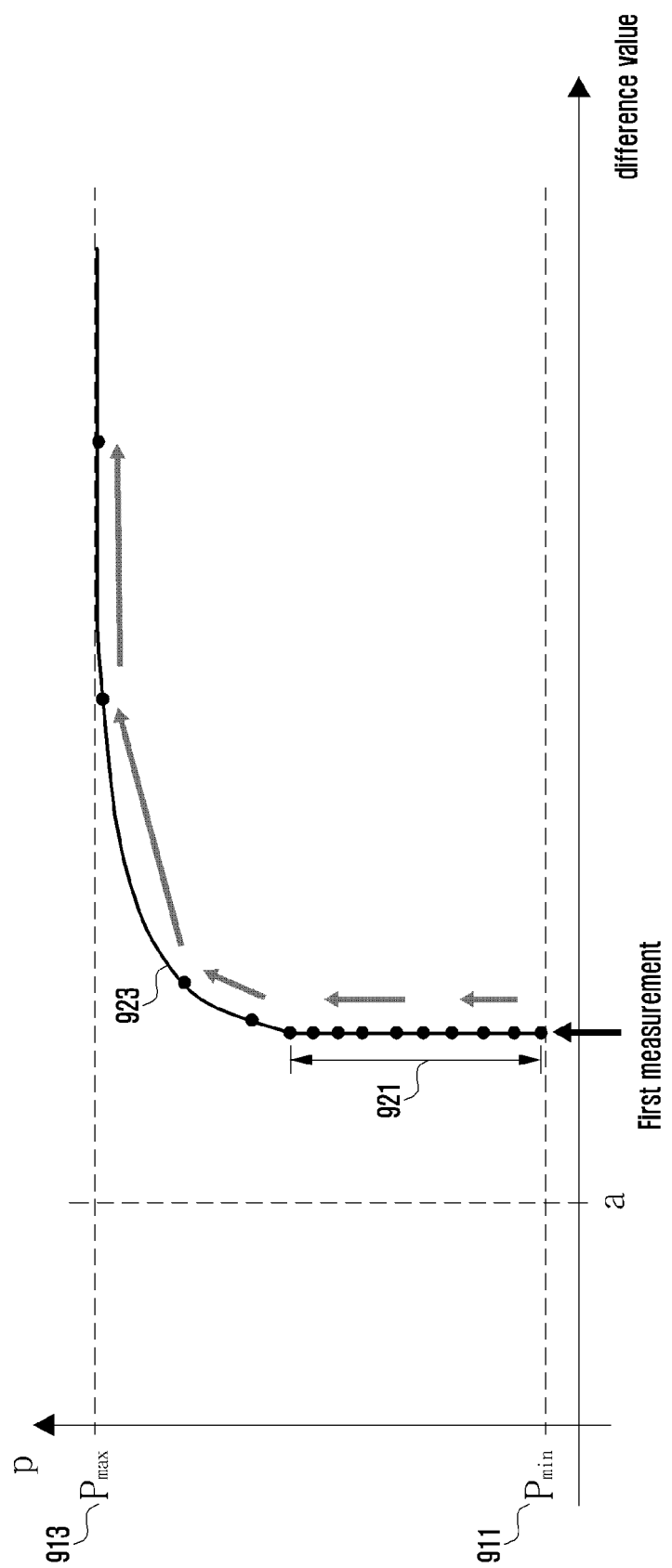

FIG. 9B is a graph illustrating an example of a function for use by the electronic device 101 in adjusting a secondary cellular communication quality measurement interval based on a change of the difference between the secondary cellular communication quality measurement result and the predetermined value according to various embodiments according to this disclosure.

Referring to the non-limiting example of FIG. 9B, the electronic device 101 may start secondary cellular communication quality measurement at a predetermined measurement interval (e.g., shortest measurement interval 911). The electronic device 101 may increase the secondary cellular communication measurement interval as the difference between the secondary cellular communication quality measurement result and the predetermined value (e.g., predetermined value 723 in FIG. 7) is maintained without any change.

According to various embodiments according to this disclosure, the electronic device 101 may increase the secondary cellular communication quality measurement interval as the difference between the secondary cellular communication quality measurement result and the predetermined value increases (e.g., secondary cellular communication quality decreases). The electronic device 101 may adjust the secondary cellular communication quality measurement interval to the longest measurement interval 913 as the difference between the secondary cellular communication quality measurement result and the predetermined value increases continuously. The electronic device 101 may increase the rate of change of the secondary cellular communication quality measurement interval as the rate of change of the difference between the secondary cellular communication quality measurement result and the predetermined value increases.

Figure 9C:
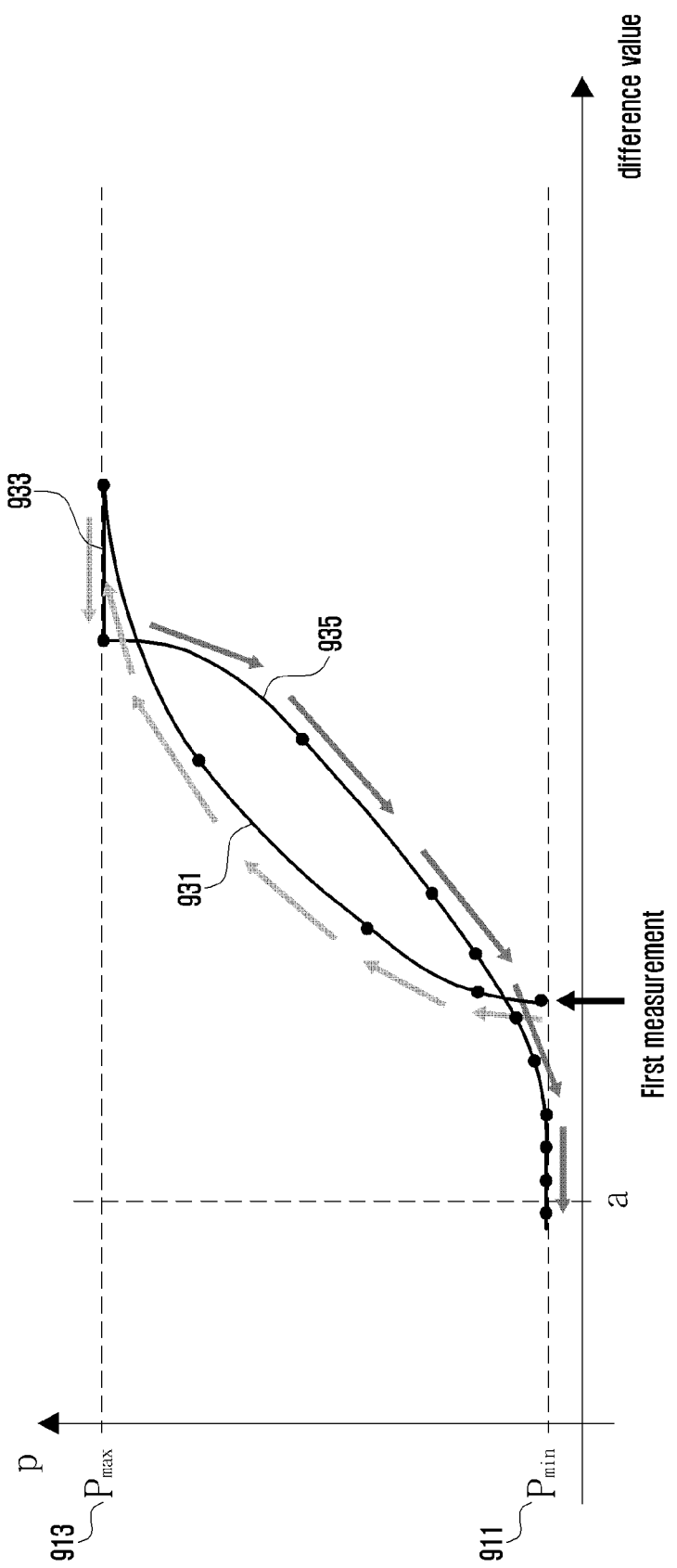

FIG. 9C is a graph illustrating an example of a function for use by the electronic device 101 in adjusting a secondary cellular communication quality measurement interval based on a change of the difference between the secondary cellular communication quality measurement result and the predetermined value according to various embodiments according to this disclosure.

According to various embodiments according to this disclosure, the electronic device 101 may increase the secondary cellular communication quality measurement interval as the difference between the secondary cellular communication quality measurement result and the predetermined value (e.g., predetermined value 723 in FIG. 7) increases as denoted by reference number 931 (e.g., secondary cellular communication quality decreases). The electronic device 101 may adjust the secondary cellular communication quality measurement interval to the longest measurement interval 913 as the difference between the secondary cellular communication quality measurement result and the predetermined value increases continuously.

According to various embodiments according to this disclosure, the electronic device 101 may maintain the secondary cellular communication quality measurement interval to be equal to the longest measurement interval 913 (e.g., secondary cellular communication quality is too poor to maintain the secondary cellular communication) as denoted by reference number 933 even through the secondary cellular communication quality measurement result indicates some improvement of the secondary cellular communication quality. The electronic device 101 may decrease the secondary cellular communication quality measurement interval as the difference between the secondary cellular communication quality measurement result and the predetermined value 723 decreases as denoted by reference number 935. The electronic device 101 may adjust the secondary cellular communication quality measurement interval to the shortest measurement interval 911 as the difference between the secondary cellular communication quality measurement result and the predetermined value 723 decreases continuously.

Figure 9D:
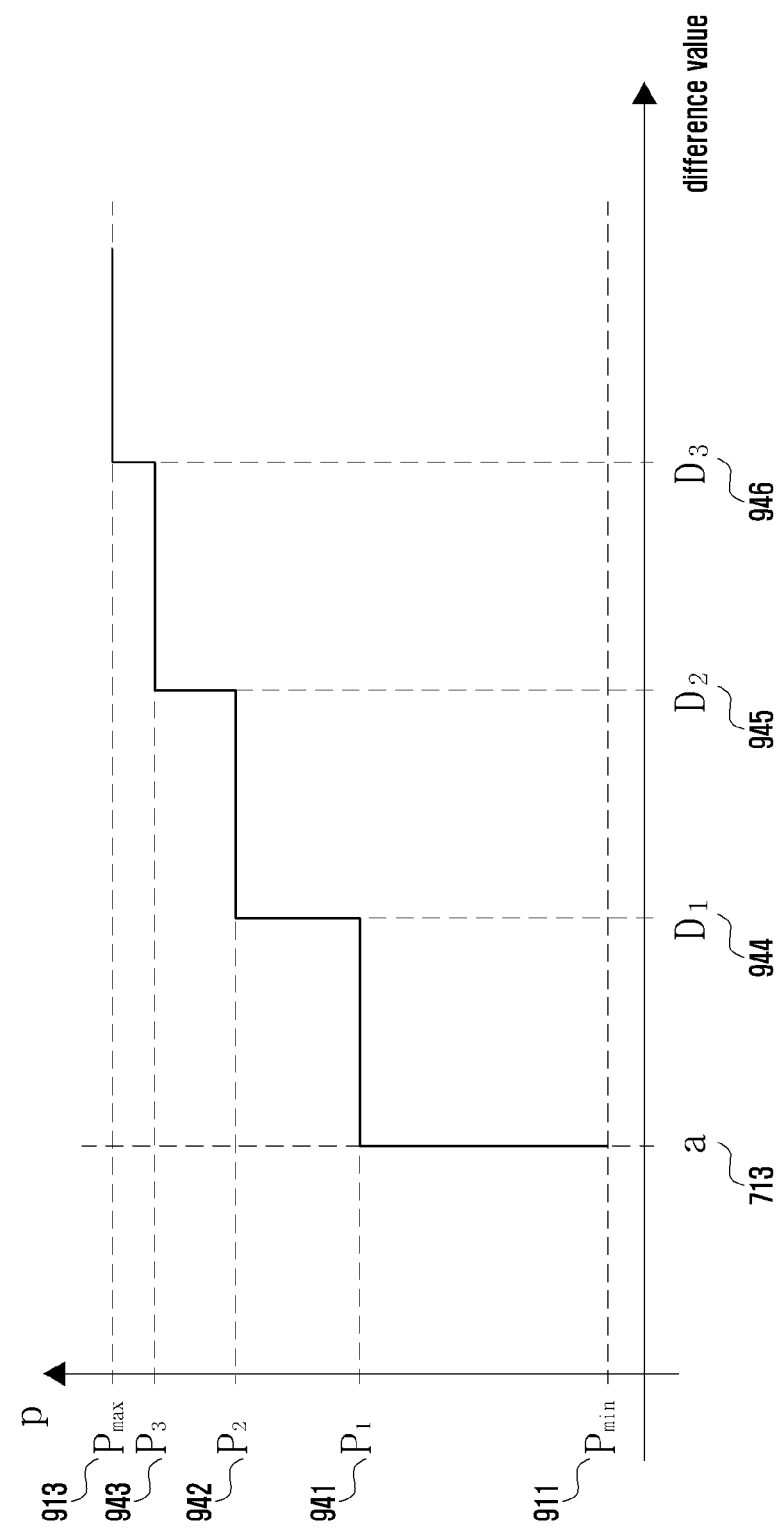

FIG. 9D is a graph illustrating an example of variation of the secondary cellular communication quality measurement interval of the electronic device 101 with respect to the difference between the secondary cellular communication measurement result and the predetermined value according to various embodiments according to this disclosure.

As shown in the illustrative example of FIG. 9D, the electronic device 101 may perform secondary cellular communication quality measurement at a secondary cellular communication quality measurement interval corresponding to a range of a difference between the secondary cellular communication quality measurement result and a predetermined value (e.g., predetermined value 723 in FIG. 7). The electronic device 101 may determine a first measurement interval 941 as the secondary cellular communication quality measurement interval based on the difference between the secondary cellular communication quality measurement result and the predetermined value 723 falling in a range between a value of a gap (e.g., gap 713 in FIG. 7) and a first difference value 944. The electronic device 101 may determine a second measurement interval 942 as the secondary cellular communication quality measurement interval based on the difference between the secondary cellular communication quality measurement result and the predetermined value 723 falling in a range between the first difference value 944 and a second difference value 945. The electronic device 101 may determine a third measurement interval 943 as the secondary cellular communication quality measurement interval based on the difference between the secondary cellular communication quality measurement result and the predetermined value 723 falling in a range between the second difference value 945 and a third difference value 946. The electronic device 101 may determine a longest measurement interval 913 as the secondary cellular communication quality measurement interval based on the difference between the secondary cellular communication quality measurement result and the predetermined value 723 falling to be greater than the third difference value 946.

According to various embodiments according to this disclosure, the electronic device 101 may configure a distance between the shortest measurement interval 911 and the first measurement interval 941, and a distance between the first measurement interval 941 and the second measurement interval 942, a distance between the second measurement interval 942 and the third measurement interval 943, and a distance between the third measurement interval 943 and the longest measurement interval 913 in various manners. The electronic device 101 may configure the measurement interval to change at equal distances such that the measurement interval increases at the same rate of change as the secondary cellular communication quality decreases. The electronic device 101 may configure the measurement interval to change in a geometric progression manner such that the measurement interval increases exponentially as the secondary cellular communication quality decreases.

According to various embodiments according to this disclosure, the electronic device 101 may configure a range between the value of the gap 713 and the first difference value 944, a range between the first difference value 944 and the second difference value 945, a range between the second difference value 945 and the third difference value 946 in various manners. The electronic device 101 may configure the difference value to change at equal distances such that the measurement interval increases at the same rate of change as the secondary cellular communication quality decreases.

Figure 9E:
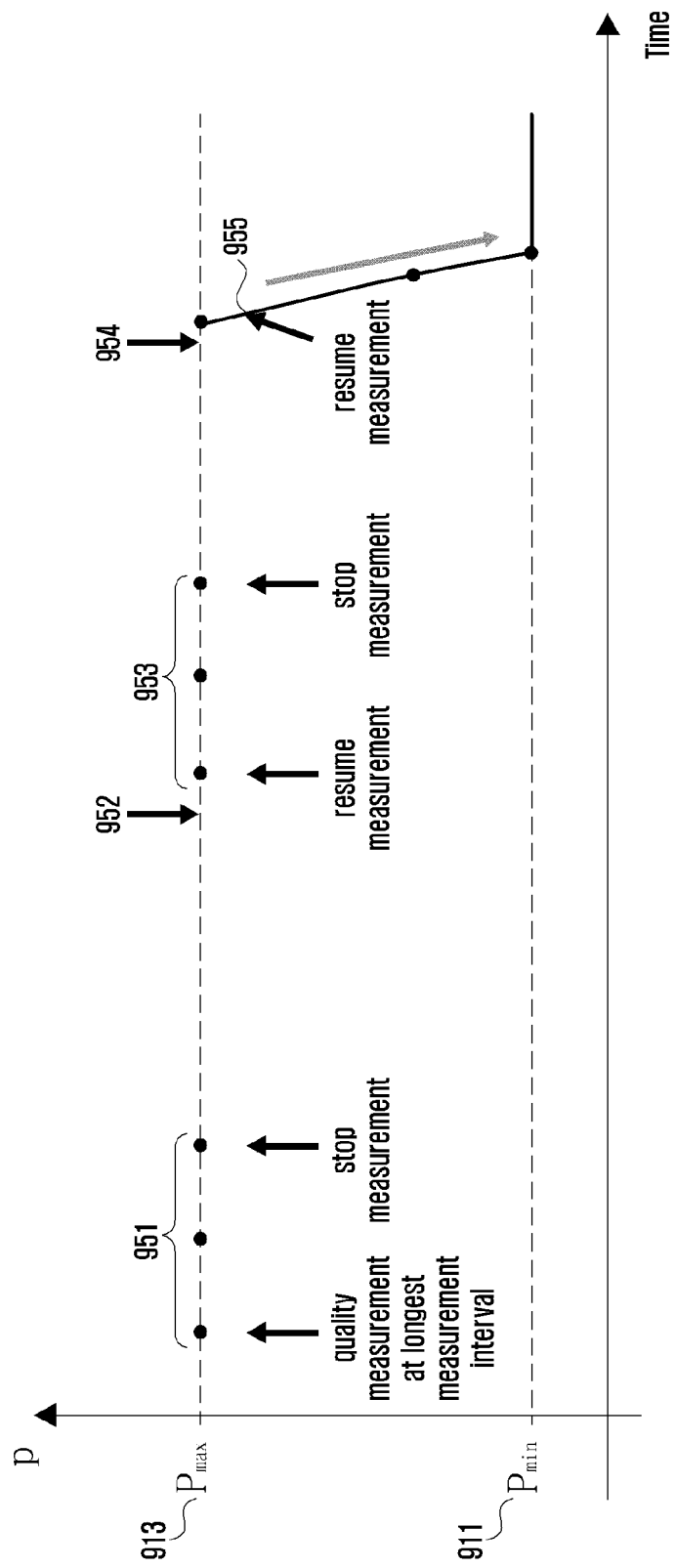

FIG. 9E is graph illustrating examples of timings at which the electronic device 101 stops and resumes secondary cellular communication quality measurement according to various embodiments according to this disclosure.

According to various embodiments according to this disclosure, the electronic device 101 may stop secondary cellular communication quality measurement based on the secondary cellular communication quality measurement interval remaining at the longest measurement interval over a predetermined time period (e.g., secondary cellular communication quality remaining at a state too poor to maintain the secondary cellular communication) as denoted by reference number 951.

According to various embodiments according to this disclosure, the electronic device may resume the secondary cellular communication quality measurement upon detection of movement of the electronic device. According to various embodiments, the electronic device 101 may perform the secondary cellular communication quality measurement at the longest measurement interval. The electronic device 101 may stop the secondary cellular communication quality measurement based on the secondary cellular communication quality measurement interval remaining at the longest measurement interval over a predetermined time period (e.g., secondary cellular communication quality remaining at a state too poor to maintain the secondary cellular communication) as denoted by reference number 953.

According to various embodiments according to this disclosure, the electronic device 101 may resume the secondary cellular communication quality measurement as denoted by reference number 955 upon detection of movement of the electronic device 101 at timing 954. According to various embodiments, the electronic device 101 may perform the secondary cellular communication quality measurement at the longest measurement interval. The electronic device 101 may decrease the secondary cellular communication quality measurement interval upon detection of a decrease of the difference between the secondary cellular communication quality measurement result and the predetermined value (e.g., increase of the secondary cellular communication quality). The electronic device 101 may adjust the secondary cellular communication quality measurement interval to the shortest measurement invention 911 as the difference between the secondary cellular communication quality measurement and the predetermined value decreases continuously.

According to various embodiments, the electronic device may adjust a secondary cellular communication-searching operation based on the secondary cellular communication quality measurement result. According to various embodiments, the search operation may include at least one of determining whether a cellular communication signal is detected in a given frequency band, determining whether a base station supporting cellular communication in a given frequency band exists, or identify at least part of information on the base station operating in a given frequency band (e.g., physical cell ID (PCI)). According to various embodiments, information on the given frequency band may be included in information that the first communication processor 610 received from the base station supporting the primary cellular communication. According to various embodiments, the first communication processor 610 may send at least part of the received frequency band information to the second communication processor 620. The electronic device 101 may adjust the secondary cellular communication-searching operation interval in the same manner as that for adjusting the secondary cellular communication quality measurement interval. The electronic device 101 may adjust the search operation interval based on the difference between the secondary cellular communication quality and a predetermined value (e.g., predetermined value 723 in FIG. 7). For example, the electronic device 101 may increase the searching operation execution interval as the difference between the second cellular communication quality and the predetermined value 723 increases.

An electronic device disclosed in various embodiments may include a first communication processor in primary cellular communication with a primary node and a second communication processor in primary cellular communication with a secondary node, wherein the first communication processor may be configured to control to receive a request signal requesting for measurement of quality of the secondary cellular communication from the primary node, transmit a signal requesting to the second communication processor for measurement of the quality of the secondary cellular communication to the second communication processor at a predetermined interval based on receipt of the request signal, receive a secondary cellular communication quality measurement result from the second communication processor, and adjust the predetermined interval based on the measurement result.

In the electronic device according to various embodiments of this disclosure, the first communication processor may be configured to control to increase the predetermined interval based on a value indicative of the secondary cellular communication quality measurement result being less than a predetermined value.

In the electronic device according to certain embodiments of this disclosure, the first communication processor may be configured to control to determine a value of a change of the predetermined interval based on a difference value between the value indicative of the secondary cellular communication quality measurement result and a predetermined value.

In the electronic device according to certain embodiments of this disclosure, the first communication processor may be configured to control to adjust the predetermined period based on a rate of change of a value indicative of the secondary cellular communication quality measurement result.

In the electronic device according to certain embodiments of this disclosure, the first communication processor may be configured to control to increase the predetermined interval based on the value indicative of the secondary cellular communication quality measurement result remaining without change.

In the electronic device according to certain embodiments of this disclosure, the first communication processor may be configured to control to determine a change amount of the predetermined interval based on a size of change of the value indicative of the secondary cellular communication quality measurement result.

In the electronic device according to certain embodiments of this disclosure, the first communication processor may be configured to control to adjust the predetermined interval based on an acceleration of change of the value indicative of the secondary cellular communication quality measurement result.

In the electronic device according to certain embodiments of this disclosure, the first communication processor may be configured to control to stop the measurement of quality of the secondary cellular communication based on the predetermined interval remaining at a maximum value over a predetermined time period.

In the electronic device according to certain embodiments of this disclosure, the first communication processor may be configured to control to perform the measurement of quality of the secondary cellular communication at the interval set to the maximum value based on detection of a movement of the electronic device.

In the electronic device according to certain embodiments of this disclosure, the first communication processor may be configured to control to determine whether the request signal is received during an on-duration period of a connected-mode discontinuous reception (C-DRX) mode and control the second communication processor to perform the measurement of quality of the secondary cellular communication during data transmission or reception via the primary cellular communication based on receipt of the request signal.

In the electronic device according to certain embodiments of this disclosure, the first communication processor may be configured to control the second communication processor to perform the measurement of quality of the secondary cellular communication after a predetermined time period based on no data transmission or reception occurring via the primary cellular communication.

In the electronic device according to certain embodiments of this disclosure, the predetermined time period may be the interval set to the maximum value or the on-duration period of the C-DRX mode.

In the electronic device according to certain embodiments of this disclosure, the secondary cellular communication quality measurement result may include a strength of a signal of the secondary cellular communication.

Figure 10:
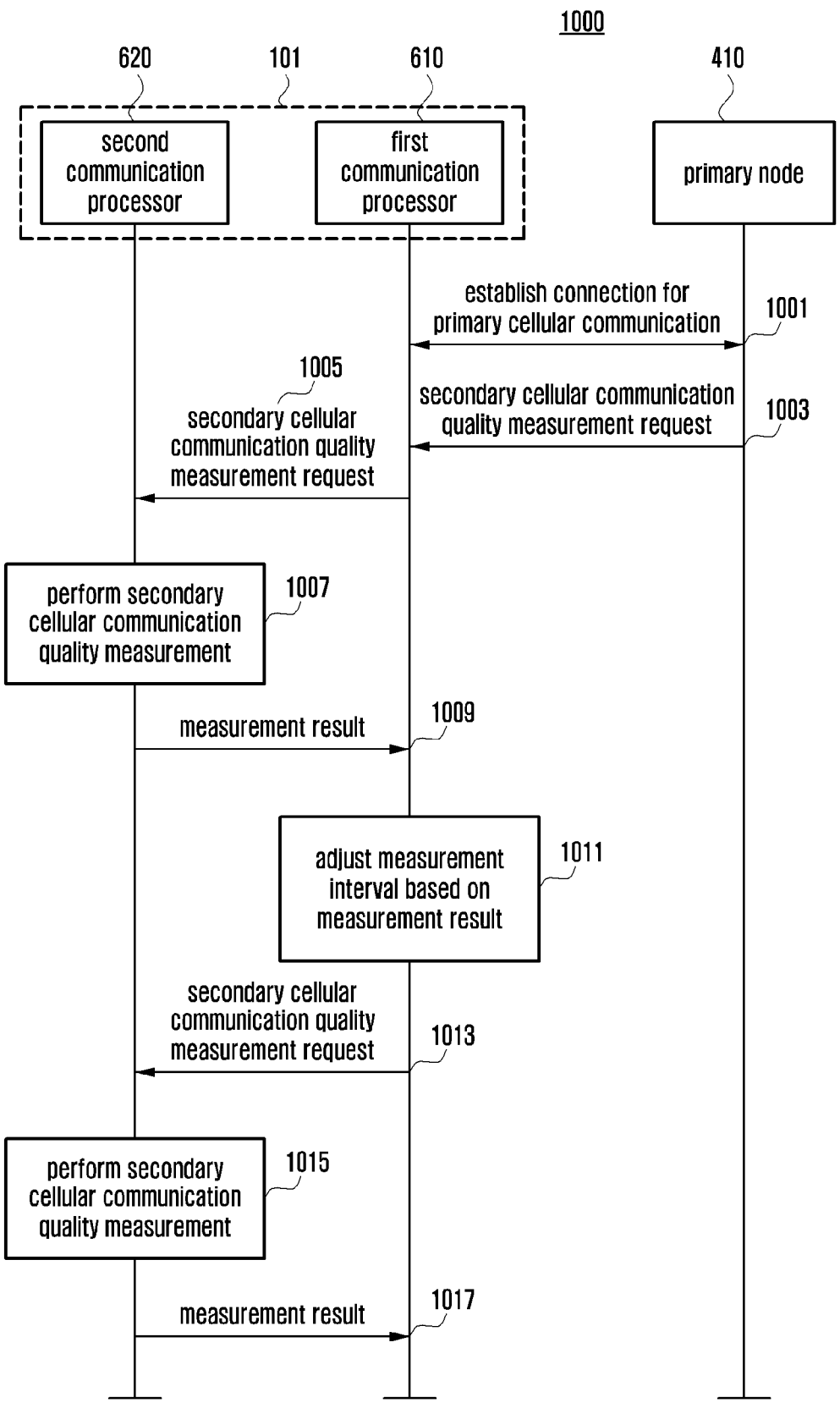
FIG. 10 is a signal flow diagram illustrating an example of a procedure for an electronic device to adjust a secondary cellular communication quality measurement interval based on secondary cellular communication quality according to various embodiments according to this disclosure.

FIG. 10 is a signal flow diagram illustrating an example of a procedure 1000 for an electronic device to adjust a secondary cellular communication quality measurement interval based on secondary cellular communication quality according to various embodiments according to this disclosure.

According to various embodiments according to this disclosure, the first communication processor (e.g., first communication processor 610) of the electronic device (e.g., electronic device 101 in FIG. 6) and the primary node (e.g., master node 410 in FIG. 4A) may establish, at operation 1001, a connection for primary cellular communication.

According to various embodiments according to this disclosure, the first communication processor 610 and the primary node 410 may establish an RRC connection for primary cellular communication. The primary node 410 may broadcast system information (e.g., system information block 1 (SIB1) and system information block 2 (SIB2)) including information indicating that it supports MD-DC.

According to various embodiments according to this disclosure, the first communication processor 610 and the primary node 410 may exchange control data related to radio bearer configuration, paging, or mobility management in the course of establishing the RRC connection.

According to various embodiments according to this disclosure, the first communication processor 610 and the primary node 410 may perform an authentication process. The authentication process may be a process for asking an operator server providing a primary or secondary cellular communication service if the electronic device 101 is allowed to use the primary or secondary cellular communication service.

According to various embodiments according to this disclosure, the primary node 410 may transmit, at operation 1003, a secondary cellular communication quality measurement request signal to the first communication processor 610.

According to various embodiments according to this disclosure, the primary node 410 transmits to the first communication processor 610 a signal including secondary cellular communication quality measurement request event (B1 event) configuration information for establishing a connection for secondary cellular communication during RRC connection reconfiguration.

According to various embodiments according to this disclosure, the first communication processor 610 may send the second communication processor 620 a secondary cellular communication quality measurement request signal at operation 1005.

According to various embodiments according to this disclosure, the second communication processor may perform secondary cellular communication quality measurement at operation 1007.

According to various embodiments according to this disclosure, the second communication processor 620 may send the first communication processor 610 a secondary cellular communication quality measurement result at operation 1009.

According to various embodiments according to this disclosure, the first communication processor 610 may adjust, at operation 1011, the secondary cellular communication quality measurement interval based on the measurement result.

According to various embodiments according to this disclosure, the first communication processor 610 may not transmit a secondary cellular communication measurement result to the primary node 410 in the case where the secondary cellular communication quality is equal to or poorer than (or poorer than) a threshold. The first communication processor 610 may adjust the secondary cellular communication quality measurement interval based on a secondary cellular communication quality-related characteristic in the case where the secondary cellular communication quality is less than a predetermined value.

According to various embodiments according to this disclosure, the first communication processor 610 may send, at operation 1013, the second communication processor 620 a secondary cellular communication quality measurement request signal at the adjusted measurement interval.

According to various embodiments according to this disclosure, the second communication processor 620 may perform secondary cellular communication quality measurement at operation 1015.

According to various embodiments according to this disclosure, the second communication processor 620 may send, at operation 1017, the first communication processor 620 a secondary cellular communication quality measurement result.

According to various embodiments according to this disclosure, the first communication processor 610 may transmit the secondary cellular communication quality measurement result to the primary node based on the secondary cellular communication quality being equal to or better than (or better than) the threshold. According to various embodiments, the first communication processor 610 may receive information on the secondary cellular communication quality measured at the adjusted measurement interval from the second communication processor 620 and transmit the information to the primary node 410. The primary node 410 may determine whether to establish a connection for secondary cellular communication between the electronic device 101 and the secondary node 420 based on the secondary cellular communication quality measurement result.

According to various embodiments according to this disclosure, the first communication processor 610 may not transmit the secondary cellular communication quality measurement result to the primary node 410 based on the secondary cellular communication quality being equal to or poorer than (or poorer than) the threshold. The first communication processor 610 may adjust the secondary cellular communication quality measurement interval based on the secondary cellular communication quality-related characteristic based on the secondary cellular communication quality being equal to or less than the predetermined value.

Figure 11:
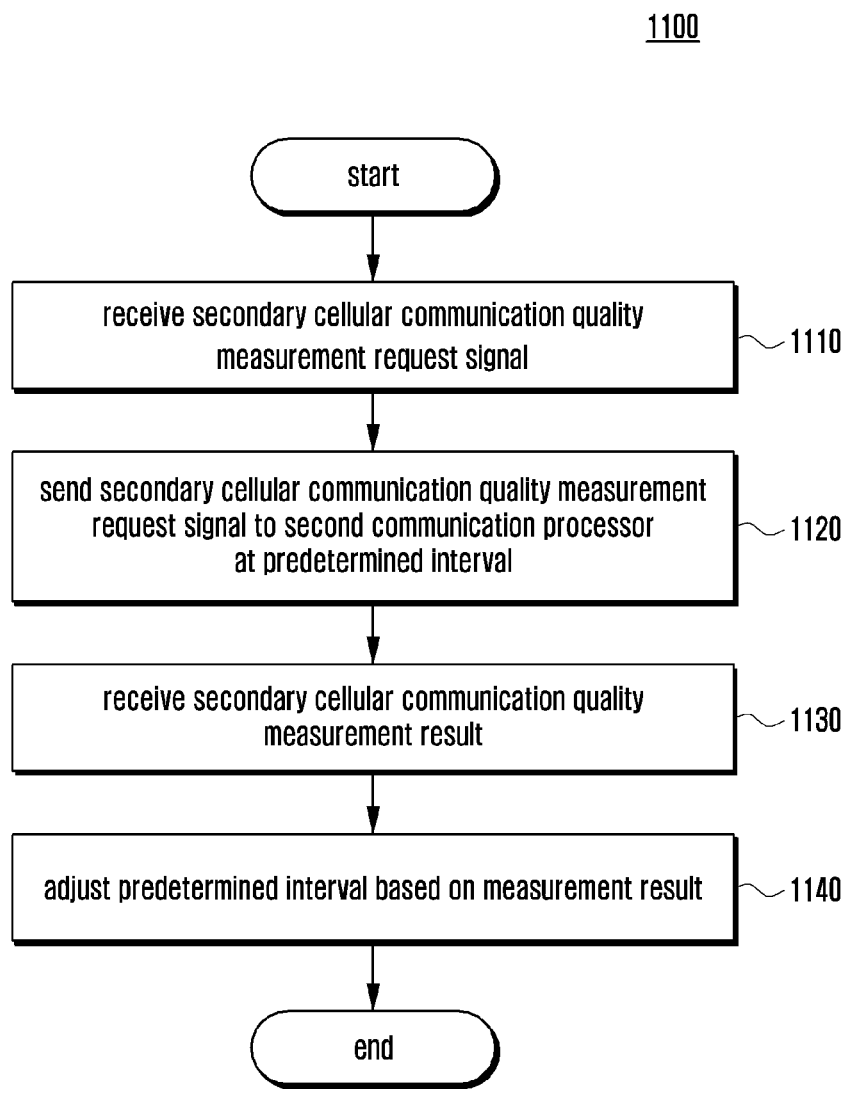
FIG. 11 illustrates an example of a method of an electronic device according to various embodiments according to this disclosure.

FIG. 11 is a flowchart illustrating an example of an operation method 1100 of an electronic device according to various embodiments according to this disclosure.

According to various embodiments according to this disclosure, the electronic device (e.g., electronic device 101 in FIG. 1 or first communication processor 610 in FIG. 6) may receive, at operation 1110, a secondary cellular communication quality measurement request signal from a primary node (e.g., master node 410 in FIG. 4A) via primary cellular communication.

According to various embodiments according to this disclosure, the primary cellular communication may be based on one of various cellular communication technologies being supported by the electronic device 101. The primary cellular communication may be based on one of a 4G mobile communication technology (e.g., LTE, LTE-Advanced (LTE-A), and LTE-A pro) or a 5G mobile communication technology (e.g., 5G New Radio (NR)) specified by 3GPP, e.g., communication technology for the first network 292 in FIG. 2. The primary node 410 may mean a base station supporting the primary cellular communication.

According to various embodiments according to this disclosure, the secondary cellular communication may be based on one of various cellular communication technologies being supported by the electronic device 101, e.g., communication technology for the second network 294 in FIG. 2. For example, the secondary cellular communication may be based on one of 5G communication technologies specified by 3GPP. The secondary node 420 may mean a base station supporting the secondary cellular communication.

According to various embodiments according to this disclosure, the electronic device 101 (or first communication processor 610) may send, at operation 1120, the second communication processor (e.g., second communication processor 620 in FIG. 6) the secondary cellular communication quality measurement request signal received from the primary node 410.

According to various embodiments according to this disclosure, the second communication processor 620 may perform secondary cellular communication quality measurement at a predetermined measurement interval after receipt of the secondary cellular communication quality measurement request signal from the first communication processor 610. Performing the secondary cellular communication quality measurement may include measuring the strength of a signal being transmitted by the secondary node 420 involved in the secondary cellular communication. The second communication processor 620 may send a secondary cellular communication quality measurement result to the first communication processor 610.

According to various embodiments according to this disclosure, the first communication processor 610 may receive, at operation 1130, the secondary cellular communication quality measurement result from the second communication processor 620.

According to various embodiments according to this disclosure, the first communication processor 610 may identify the secondary cellular communication quality measurement result and determine whether the secondary cellular communication quality is equal to or better than (or better than) a threshold. The first communication processor 610 may transmit the secondary cellular communication quality measurement result to the primary node 410 based on the secondary cellular communication quality being equal to or better than (or better than) the threshold. The first communication processor 610 may not transmit the secondary cellular communication quality measurement result to the primary node 410 based on the secondary cellular communication quality being poorer than (or equal to or poorer than) the threshold.

According to various embodiments according to this disclosure, the electronic device 101 (or first communication processor 610) may adjust, at operation 1140, the secondary cellular communication quality measurement interval based on the secondary cellular communication quality measurement result.

According to various embodiments according to this disclosure, the first communication processor 610 may increase the secondary cellular communication quality measurement interval based on the secondary cellular communication quality measurement result being less than a predetermined value. The predetermined value may be a value associated with the threshold in use by the electronic device 101 to determine whether to transmit the secondary cellular communication quality measurement result to the primary node 410. For example, the predetermined value may be set to a value obtained by subtracting a predetermined size of a gap from the threshold. The size of the gap may be variable according to the secondary cellular communication quality or fixed regardless of the secondary cellular communication quality.

According to various embodiments according to this disclosure, the first communication processor 610 may determine a change amount of the measurement interval based on a difference between the secondary cellular communication quality measurement result and the predetermined value. The first communication processor 610 may increase the change amount of the measurement interval as the difference between the secondary cellular communication quality measurement result and the predetermined value increases. The first communication processor 610 may decrease the change amount of the measurement interval as the difference between the secondary cellular communication quality measurement result and the predetermined value decreases.

According to various embodiments according to this disclosure, the first communication processor 610 may adjust the measurement interval based on a rate of change of the secondary cellular communication quality measurement result. The rate of change of the secondary cellular communication quality measurement result may be a rate of change of a value indicating the secondary cellular communication quality measurement result (e.g., time domain first order differential value of the secondary cellular communication quality measurement result).

According to various embodiments according to this disclosure, the first communication processor 610 may adjust the measurement interval based on the acceleration of change of the secondary cellular communication quality measurement. The acceleration of change of the secondary cellular communication quality measurement may be a second order rate of change of a value indicating the secondary cellular communication quality measurement result (e.g., time domain second order differential value of the value indicating the secondary cellular communication quality measurement value). The electronic device 101 may adjust the measurement interval based on the acceleration of change of the secondary cellular communication quality measurement result in consideration of the mobility of the electronic device. For example, if the electronic device 101 moves into or out of the coverage of the secondary node 420, it may adjust the measurement interval based on its moving speed.

An operation method of an electronic device that is according to certain embodiments of this disclosure may include receiving, at a first communication processor, a request signal requesting for measurement of quality of secondary cellular communication from a primary node in primary cellular communication with the electronic device, transmitting a signal requesting for measurement of the quality of the secondary cellular communication, from the first communication processor to a second communication processor in secondary cellular communication with a secondary node, at a predetermined interval, receiving, at the first communication processor, a secondary cellular communication quality measurement result from the second communication processor, and adjusting, at the first communication processor, the predetermined interval based on the measurement result.

In the operating method of an electronic device according to certain embodiments of this disclosure, adjusting the predetermined interval may include increasing, at the first communication processor, the predetermined interval based on a value indicative of the secondary cellular communication quality measurement result being less than a predetermined value.

In the operating method of an electronic device is according to certain embodiments of this disclosure, adjusting the predetermined interval may include adjusting, at the first communication processor, the predetermined interval based on a rate of change of a value indicative of the secondary cellular communication quality measurement result.

In the operating method of an electronic device according to various embodiments of this disclosure, adjusting the predetermined interval may include increasing, at the first communication processor, the predetermined interval based on the value indicative of the secondary cellular communication quality measurement result remaining without change.

In the operating method of an electronic device according to various embodiments of this disclosure, adjusting the predetermined interval may include identifying, at the first communication processor, a change amount of the predetermined interval based on a size of change of the value indicative of the secondary cellular communication quality measurement result.

The operating method of the electronic device according to certain embodiments of this disclosure may further include determining, at the first communication processor, whether the request signal is received during an on-duration period of a connected-mode discontinuous reception (C-DRX) mode and controlling, at the first communication processor, the second communication processor to perform quality measurement on the secondary cellular communication during data transmission or reception via the primary cellular communication based on receipt of the request signal.

The operating method of the electronic device according to certain embodiments of this disclosure may further include controlling, at the first communication processor, the second communication processor to perform quality measurement on the secondary cellular communication after a predetermined time period based on no data transmission or reception occurring via the primary cellular communication.

As described above, the electronic device and cellular communication quality measurement interval adjustment method thereof disclosed in various embodiments is advantageous in terms of allowing adjustment of a communication quality measurement interval for a secondary cellular communication system based on the characteristics associated with quality of secondary cellular communication in the state where the electronic device is connected to a primary cellular communication system. The electronic device and cellular communication quality measurement interval adjustment method thereof disclosed in various embodiments is advantageous in terms of reducing unnecessary power consumption caused by repetition of communication quality measurement for the secondary cellular communication system in an area where the signal quality of the secondary cellular system is weak in such a way of increasing the communication quality measurement interval for a secondary cellular communication system.

The electronic device and cellular communication quality measurement interval adjustment method according to certain embodiments of this disclosure is advantageous in terms of allowing the electronic device operating in a connected-mode discontinuous reception (C-DRX) mode to perform communication quality measurement for a secondary communication system upon receipt of a secondary cellular communication quality measurement request signal in the state of communicating data with a primary cellular system. The electronic device and cellular communication quality measurement interval adjustment method according to various embodiments is advantageous in terms of protecting against unnecessary power consumption caused by the necessity of secondary cellular communication quality measurement that disrupts entry into the sleep duration of the C-DRX mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a first communication processor in a first cellular communication with a first node; and
   a second communication processor in a secondary cellular communication with a secondary node,
   wherein the first communication processor is configured to:
   control to receive a request signal requesting measurement of a quality of a secondary cellular communication from the first node,
   transmit a signal requesting to the second communication processor for measurement of the quality of the secondary cellular communication to the second communication processor at a predetermined interval based on receipt of the request signal,
   receive a secondary cellular communication quality measurement result from the second communication processor,
   determine whether to adjust the predetermined interval based on the secondary cellular communication quality measurement result,
   in response to determining to adjust the predetermined interval, determine a value of a change of the predetermined interval based on a difference value between a value indicative of the secondary cellular communication quality measurement result and a predetermined value while the value indicative of the secondary cellular communication quality measurement result is lower than the predetermined value, and wherein the value of the change of the predetermined interval differs based on the difference value, and
   adjust the predetermined interval based on the value of the change of the predetermined interval.

2. The electronic device of claim 1, wherein the first communication processor is configured to control to increase the predetermined interval based on the value indicative of the secondary cellular communication quality measurement result being less than the predetermined value.

3. The electronic device of claim 1, wherein the first communication processor is configured to control to adjust the predetermined interval based on a rate of change of the value indicative of the secondary cellular communication quality measurement result.

4. The electronic device of claim 1, wherein the first communication processor is configured to control to adjust the predetermined interval based on an acceleration of change of the value indicative of the secondary cellular communication quality measurement result.

5. The electronic device of claim 1, wherein the first communication processor is configured to control to stop the measurement of the quality of the secondary cellular communication based on the predetermined interval remaining at a maximum value over a predetermined time period.

6. The electronic device of claim 1, wherein the first communication processor is configured to control to determine whether the request signal is received during an on-duration period of a connected-mode discontinuous reception (C-DRX) mode and control the second communication processor to perform the measurement of the quality of the secondary cellular communication during data transmission or reception via the first cellular communication based on receipt of the request signal.

7. The electronic device of claim 1, wherein the secondary cellular communication quality measurement result comprises a strength of a signal of the secondary cellular communication.

8. The electronic device of claim 3, wherein the first communication processor is configured to control to increase the predetermined interval based on the value indicative of the secondary cellular communication quality measurement result remaining without change.

9. The electronic device of claim 3, wherein the first communication processor is configured to control to determine a change amount of the predetermined interval based on a size of change of the value indicative of the secondary cellular communication quality measurement result.

10. The electronic device of claim 5, wherein the first communication processor is configured to control to perform the measurement of the quality of the secondary cellular communication at an interval set to the maximum value based on detection of a movement of the electronic device.

11. The electronic device of claim 6, wherein the first communication processor is configured to control the second communication processor to perform the measurement of the quality of the secondary cellular communication after a predetermined time period based on no data transmission or reception occurring via the first cellular communication.

12. The electronic device of claim 11, wherein the predetermined time period is an interval set to a maximum value or the on-duration period of the C-DRX mode.

13. An operation method of an electronic device, the method comprising:
    receiving, at a first communication processor, a request signal requesting measurement of a quality of a secondary cellular communication from a first node in first cellular communication with the electronic device;
    transmitting a signal requesting for measurement of the quality of the secondary cellular communication, from the first communication processor to a second communication processor in secondary cellular communication with a secondary node, at a predetermined interval;

receiving, at the first communication processor, a secondary cellular communication quality measurement result from the second communication processor;

determining whether to adjust, at the first communication processor, the predetermined interval based on the secondary cellular communication quality measurement result;

in response to determining to adjust the predetermined interval, determining a value of a change of the predetermined interval based on a difference value between a value indicative of the secondary cellular communication quality measurement result and a predetermined value while the value indicative of the secondary cellular communication quality measurement result is lower than the predetermined value, and wherein the value of the change of the predetermined interval differs based on the difference value; and adjusting the predetermined interval based on the value of the change of the predetermined interval.

14. The method of claim 13, wherein adjusting the predetermined interval comprises increasing, at the first communication processor, the predetermined interval based on the value indicative of the secondary cellular communication quality measurement result being less than a predetermined value.

15. The method of claim 13, wherein adjusting the predetermined interval comprises adjusting, at the first communication processor, the predetermined interval based on a rate of change of the value indicative of the secondary cellular communication quality measurement result.

16. The method of claim 13, further comprising:
determining, at the first communication processor, whether the request signal is received during an on-duration period of a connected-mode discontinuous reception (C-DRX) mode; and controlling, at the first communication processor, the second communication processor to perform quality measurement on the secondary cellular communication during data transmission or reception via the first cellular communication based on receipt of the request signal.

17. The method of claim 15, wherein adjusting the predetermined interval comprises increasing, at the first communication processor, the predetermined interval based on the value indicative of the secondary cellular communication quality measurement result remaining without change.

18. The method of claim 15, wherein adjusting the predetermined interval comprises identifying, at the first communication processor, a change amount of the predetermined interval based on a size of change of the value indicative of the secondary cellular communication quality measurement result.

19. The method of claim 16, further comprising controlling, at the first communication processor, the second communication processor to perform the quality measurement on the secondary cellular communication after a predetermined time period based on no data transmission or reception occurring via the first cellular communication.

* * * * *